(12) United States Patent
Thangeswaran et al.

(10) Patent No.: US 12,254,054 B2
(45) Date of Patent: *Mar. 18, 2025

(54) SYSTEMS AND METHODS FOR ENTERPRISE WEB APPLICATION DASHBOARD MANAGEMENT

(71) Applicant: NASDAQ, INC., New York, NY (US)

(72) Inventors: Sivakumaresan Thangeswaran, Karnataka (IN); Binumohan Chandramohan, Karnataka (IN); Rajkumar Vedha Siva, Karnataka (IN)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,699

(22) Filed: Feb. 23, 2024

(65) Prior Publication Data

US 2024/0193214 A1 Jun. 13, 2024

Related U.S. Application Data

(63) Continuation of application No. 18/305,692, filed on Apr. 24, 2023, now Pat. No. 11,947,611, which is a
(Continued)

(30) Foreign Application Priority Data

Jun. 26, 2017 (IN) .............................. 201711022312
Jun. 22, 2018 (IN) .............................. 201811023417

(51) Int. Cl.
*G06F 16/9535* (2019.01)
*G06F 16/9538* (2019.01)
(Continued)

(52) U.S. Cl.
CPC ...... *G06F 16/9535* (2019.01); *G06F 16/9538* (2019.01); *G06F 16/9574* (2019.01); *H04L 67/02* (2013.01)

(58) Field of Classification Search
CPC ............. G06F 16/9535; G06F 16/9574; G06F 16/9538
(Continued)

(56) References Cited

U.S. PATENT DOCUMENTS 9,645,797 B2 * 5/2017 Savliwala ............... H04L 67/53
9,742,708 B2 * 8/2017 Yoshida .................. H04L 67/02
(Continued)

OTHER PUBLICATIONS

International Search Report for PCT/IN2018/050419 mailed Oct. 9, 2018, 2 pages.

*Primary Examiner* — Anthony Mejia
(74) *Attorney, Agent, or Firm* — Nixon & Vanderhye, PC

(57) ABSTRACT

The described technology relates to developing and/or maintaining dashboards in enterprise web applications. In some aspects, a portal web application is configured to provide a user interface on a client device to create or modify a dashboard which includes a first plurality of widgets. A second plurality of widgets includes widgets published to the portal web application from a plurality of subscriber web applications, where each of the second plurality of widgets is used in at least one of said subscriber web applications, and the first plurality of widgets includes one or more widgets from the second plurality of widgets. In some other aspects, a dashboard management service is provided by which respective enterprise web applications can create and host widgets while sharing the same with other enterprise web applications which use dashboards developed using the dashboard management service.

19 Claims, 26 Drawing Sheets

Related U.S. Application Data continuation of application No. 17/560,638, filed on Dec. 23, 2021, now Pat. No. 11,669,578, which is a continuation of application No. 16/626,376, filed as application No. PCT/IN2018/050419 on Jun. 26, 2018, now Pat. No. 11,210,353.

(51) Int. Cl.
*G06F 16/957* (2019.01)
*H04L 67/02* (2022.01)

(58) Field of Classification Search
USPC .......................................... 709/200; 707/772
See application file for complete search history.

(56) References Cited

U.S. PATENT DOCUMENTS

| | | | |
|---|---|---|---|
| 10,089,654 B1 * | 10/2018 | Chang | G06F 40/143 |
| 2008/0148283 A1 | 6/2008 | Allen | |
| 2009/0313601 A1 | 12/2009 | Baird | |
| 2010/0031147 A1 | 2/2010 | Williams | |
| 2011/0060994 A1 * | 3/2011 | Maxwell | H04L 67/306 |
| | | | 715/764 |
| 2011/0125854 A1 * | 5/2011 | Macken | H04L 67/55 |
| | | | 709/206 |
| 2011/0126134 A1 * | 5/2011 | Macken | G06F 16/958 |
| | | | 715/760 |
| 2011/0247031 A1 | 10/2011 | Jacoby | |
| 2011/0289428 A1 | 11/2011 | Yuen | |
| 2012/0130807 A1 | 5/2012 | Steelberg | |
| 2012/0280790 A1 | 11/2012 | Gerhardt | |
| 2013/0268437 A1 | 10/2013 | Desai | |
| 2013/0339345 A1 * | 12/2013 | Soto Matamala | G06F 16/248 |
| | | | 707/722 |
| 2014/0181314 A1 * | 6/2014 | Barzilai | H04L 67/56 |
| | | | 709/227 |
| 2015/0153918 A1 | 6/2015 | Chen | |
| 2016/0085514 A1 * | 3/2016 | Savliwala | H04L 63/101 |
| | | | 717/109 |
| 2017/0060636 A1 | 3/2017 | Smith et al. | |
| 2017/0142076 A1 | 5/2017 | Ford et al. | |
| 2017/0212668 A1 | 7/2017 | Shah | |
| 2018/0365957 A1 | 12/2018 | Wright | |

* cited by examiner

```
publish Context change:
// emit context change event (with KEY and VALUE)
$scope.$broadcast($dmsEvents.CONTEXT_CHANGED, "ticker", ticker );    /— 702

Widget to get context as below on Load:

var listManagerWidgetController = ["$scope", function ($scope) {    /— 704
$scope.Ticker = $scope.dashboardContext.ticker;
```

```
JS
// sampleModule feature app
var sampleModule = angular.module("sampleModule", ["dms.package"]);
sampleModule.config(function ($dmsProvider) {
    // Initialize Dashboard App
    $dmsProvider.config(
        {
            // The input config details goes here
        }
    );
});
```

804

```
HTML
<ui-view>
    <div class="content-wrapper">
        <section class="content">
            <div>
                <dms-view>
                    <!-- widgets goes here -->
                </dms-view>
            </div>
        </section>
    </div>
</ui-view>
```

Figure 8

```
UIBootstrap creates module and cache with the same name...

angular.module("uib/template/tooltip/tooltip-html-popup.html", []).run([["$templateCache", function($templateCache) {
$templateCache.put("uib/template/tooltip/tooltip-html-popup.html",
    "<div class=\"tooltip\"\n" +
    "   tooltip-animation-class=\"fade\"\n" +
    "   uib-tooltip-classes\n" +
    "   ng-class=\"{ in: isOpen() }\">\n" +
    "  <div class=\"tooltip-arrow\"></div>\n" +
    "  <div class=\"tooltip-inner\" ng-bind-html=\"contentExp()\"></div>\n" +
    "</div>\n" +
    "");
}]);
```

SYSTEMS AND METHODS FOR ENTERPRISE WEB APPLICATION DASHBOARD MANAGEMENT

CROSS REFERENCE TO RELATED APPLICATIONS

This application is a continuation of U.S. application Ser. No. 18/305,692 filed Apr. 24, 2023, which is a continuation of U.S. application Ser. No. 17/560,638 filed Dec. 23, 2021, now U.S. Pat. No. 11,669,578 issued Jun. 6, 2023, which is a continuation of U.S. application Ser. No. 16/626,376 filed Dec. 24, 2019, now U.S. Pat. No. 11,210,353, which issued on Dec. 28, 2021, which is the U.S. national phase of International Application No. PCT/IN2018/050419 filed Jun. 26, 2018 which designated the U.S. and claims priority to Indian Provisional Patent Application No. 201811023417 filed on Jun. 22, 2018 and is also a continuation-in-part of, and claims priority to Indian Patent Application No. 201711022312 filed Jun. 26, 2017, the entire contents of each of which are hereby incorporated by reference.

TECHNICAL OVERVIEW

The technology described technology relates to developing and/or maintaining dashboards in enterprise web applications.

BACKGROUND

Many corporations have several web applications deployed on server infrastructure locally at a corporate site, remotely at third party sites and/or in the cloud. Each of the web applications may be used in one or more of the corporation's functions. In large organizations, different web applications may be used by separate groups for the same function. Modern web applications provide a previously unparalleled level of information availability and a wide range of presentation options for any information.

As the number of web applications grows and the range and depth of services offered by each web application improves, many users may find it onerous to access desired information by separately engaging with each application. The higher the number of available web applications, the time required to access each of them separately increases. The higher complexity, range and depth of the services offered by each web application, also makes it cumbersome to identify and access only the desired information from each web application.

Aspects of these separate web applications in an enterprise can be synergistically integrated in a manner that allows a user to access the necessary information across various web applications quickly and efficiently, while eliminating or reducing the time needed to separately engage with each separate web application. Thus, techniques are desired for integrating access to functions of plural enterprise web applications.

Moreover, with applications growing in complexity, it may often be desired to share certain application components between applications, such that the development time and the like can be reduced. Techniques for such sharing of application components among plural enterprise web applications are also desired.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

An example embodiment provides a system to create and maintain enterprise web application dashboards. The system may include a processing system and a storage. The processing system may be configured to execute a portal web application to provide a user interface on a client device to create or modify a dashboard which includes a first plurality of widgets. The storage may store a second plurality of widgets including widgets published to the portal web application from a plurality of subscriber web applications. Each of the second plurality of widgets is used in at least one of said subscriber web applications, and the first plurality of widgets may include one or more widgets from the second plurality of widgets.

Another example embodiment provides a method. The method, includes executing, on a server computer processing system, a portal web application. The portal web application may be configured to provide a user interface to (1) create a dashboard including a first plurality of widgets, and (2) publish widgets from one or more subscriber web applications. The method further includes receiving a request from a user of a client computer system to create a new dashboard, and enabling the user to select at least some of the first plurality of widgets from a second plurality of widgets stored on a first storage to arrange on the new dashboard, the second plurality of widgets including widgets published by a plurality of subscriber web applications to the portal web application.

Another example embodiment includes a non-transitory computer readable storage medium storing instructions which, when executed by at least one processor of a server computer processing system provides for executing, on the server computer processing system, a portal web application configured to provide a user interface to (1) create a dashboard including a first plurality of widgets, and (2) publish widgets from one or more subscriber web applications. The executed instructions further provide for receiving a request from a user of a client computer system to create a new dashboard, and enabling the user to select at least some of the first plurality of widgets from a second plurality of widgets stored on a first storage to arrange on the new dashboard, the second plurality of widgets including widgets published by a plurality of subscriber web applications to the portal web application.

Another example embodiment includes a system to create and maintain enterprise web application dashboards. The system comprises a first processing system configured to execute a dashboard management service communicating with dashboards executing on one or more other processing systems, the dashboards including a first dashboard in which a first widget is arranged. The first widget is developed in a first enterprise application environment on a second processing system, and published to the dashboard management service. The first dashboard is developed in a second enterprise application environment and the first widget is arranged in the first dashboard in a hosting container which communicates with an application programming interface of the dashboard management service.

Another embodiment provides a method to create and maintain enterprise web application dashboards. The method comprises executing a dashboard management service on a first processing system configured to communicate with dashboards executing on one or more other processing systems, the dashboards including a first dashboard in which a first widget is arranged. The method further includes receiving the first widget upon said publishing to the dashboard management service by a first enterprise application; and communicating with a hosting container in which the first widget is arranged, wherein the hosting container is arranged in the first dashboard.

This summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 7 illustrates an example code snippet for subscribing and publishing context changes to widgets, according to some example embodiments;

FIG. 8 illustrates an example code snippets for invoking a dashboard, according to some example embodiments;

FIG. 15 illustrates an example code snippet for template caching during the bundling and packaging process, according to some example embodiments;

FIG. 17 illustrates a code snippet of an example widget specified as an AngularJS entity, according to some example embodiments;

DETAILED DESCRIPTION

Figure 1:
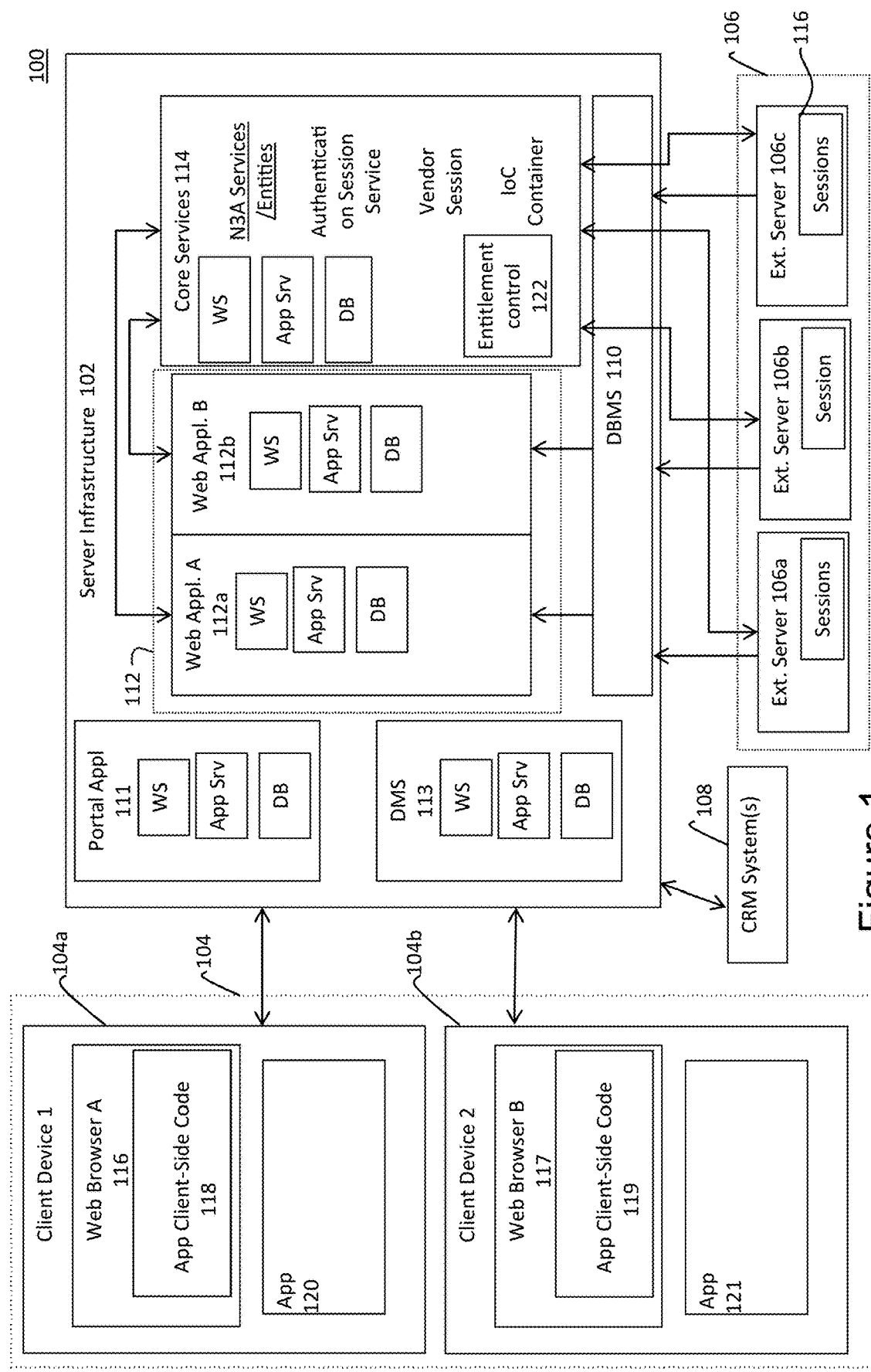
FIG. 1 illustrates a computing environment of a dashboard management system having one or more client devices configured to execute one or more of an event application client and a web application client, and one or more server devices executing web application server components and a portal application and/or a dashboard management service web application, according to some example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other subjects, dashboard user interfaces (herein referred to simply as "dashboard") in enterprise web applications. The described technology may improve the efficiency in dashboard development and deployment, facilitate new dashboards comprising widgets developed for other web application environments, facilitate streamlining of authorizations required for certain data services underlying some widgets in dashboards, and enable developers to develop widgets for a plurality of web applications with some of the widgets being shareable between applications. In some example embodiments, an improved capability is provided by a portal web application that provides for developing dashboards incorporating widgets from a plurality of web applications, and for publishing and providing access to widgets developed in other web applications. In some embodiments such capabilities are provided by a Dashboard Management Service (DMS), with or without a portal web application. The dashboards integrating widgets from multiple web applications, according to some example embodiments, provide improved capabilities to the enterprise web application clients.

Example embodiments provide the improved capability for developing dashboards incorporating widgets from a plurality of web applications desired integration by providing a development platform including a software development kit (SDK) and/or script library, access to application programming interfaces (API) for each of the plurality of web applications, and code libraries that can be easily and efficiently incorporated in new widget code.

Some example embodiments provide a DMS that is an end-to-end web application platform, which facilitate development of web components such as, but not limited to, modules, views, dashboards, widgets, cards, etc. The developed web component can then be managed using the DMS environment hosted in the enterprise servers and its various tools. The DMS provides for the capability to develop once and to share the web components across several products such as enterprise web applications, each of which implements a DMS hosting container for the web component. The share capability is supported by integrating the DMS hosting container into the web applications and building components on top of it. A shared widget can work with the product's (e.g., enterprise web application's) context which is achieved by implementing certain interfaces exposed by the framework. The DMS facilitates developing UI components independently (with a reference to required data APIs) and packaging the code with all the dependencies (such as, for example, HTML, JavaScript and CSS) using provided tools, upload the same to the common repository.

A widget is a distributable independent web component which is configured to operate seamlessly with in any other web component such as a dashboard and/or layout operating as a parent component. A widget may be created as an AngularJS module and configured to expose an AngularJS component in the name of the widget. The exposed component may be read and rendered inside a parent (e.g., dashboard, layout etc.) and/or in a DMS hosting container when metadata is available for the framework to render.

According to some embodiments, a dashboard represents a view or SPA (Single Page Application) in a web application. Some application may use a collection of views/SPAs stitched through a server program. Some embodiments provide for adding new dashboards with minimal coding effort by including/arranging already developed widgets together in a page.

The improved capability of example embodiments for publishing and providing access to widgets developed in other web applications is achieved by, at least in part, a platform that enables efficient publishing of widgets directly from other web applications' environments to the portal web application's environment and/or to the dashboard management service.

In example embodiments, a portal web application provides a software development and execution platform for developing widgets and for hosting widgets. The widgets may be developed using a dashboard software development kit (dashboard SDK) and/or script library provided by the platform, and may be tested and published without a portal deployment. The platform may also enable widgets to be added to, or deleted from, a dashboard at any time. Context changes for widgets may also be managed by the platform. Example embodiments may provide for developers to use the dashboard SDK and/or script library to develop and publish widgets from other web applications too. The dashboard SDK and/or script library may provide for a mock dashboard (also referred to as a test-harness dashboard) to be created along with the widget in an application environment even if outside the portal web application. The dashboard SDK and/or script library may also provide a dashboard where widgets can be hosted and tested in any application environment.

In some example embodiments, a DMS provides a user interface (UI) framework for building widgets/cards and for publishing the same into a unified platform. A large corporation, like, for example, Nasdaq has several products and platforms to the business/financial needs for their targeted clients. Though there are different products and though separate teams may own those products, some functionalities and UI pieces are mostly created/duplicated between products. For example, market data related views may, at least in some embodiments, be utilized in several of Nasdaq's web applications. Example embodiments may provide a portal platform (provided by the portal web application) which is hosted independently of any other enterprise web application, and which enables different development teams to continue working on separate web applications to develop widgets/cards for those respective web applications. The developed widgets from other web applications may be subsequently published to the portal web application and/or otherwise shared with other applications through the DMS.

As discussed above, with the increased complexity and offered capabilities of many enterprise web applications, conventional techniques for making changes to the application code and/or adding new functionality are often very time consuming. Moreover, conventional platforms do not allow for convenient use of widgets across applications. For example, a widget to access a data service in one web application may, in conventional techniques, have to be significantly modified with new or modified code before it is used in a second web application. The introduction of modifications and/or additions often requires a lengthy testing process of all the various aspects of the web application. Example embodiments, enable rapid development and publishing of widgets from one web application to another in the portal web applications, such that dashboards developed either in the portal web application or other web applications quickly incorporate such published widgets, thereby shortening the time to change applications.

The common platform for publishing and sharing widgets among multiple web applications, results in improvement of the overall computer system performance by reducing duplication (e.g., of widget code) and as a result lowering the size of the disk storage required and/or the space required in random access memory. The common platform also enables and facilitates rapid and incremental improvements/upgrades to systems.

Thus, embodiments of the present invention provide techniques for addressing issues that arise when multiple web applications have at least some of the functionalities in common with one or more other web applications. Example embodiments improve utilization of storage and memory capabilities of the system by reducing duplication of software components, allow for improving the overall quality and performance of software by enabling particular development groups to focus on developing and maintaining particular software that are then shared by many different applications, and improves the development cycle by facilitating efficient authoring and deployment of web applications.

Figure 2:
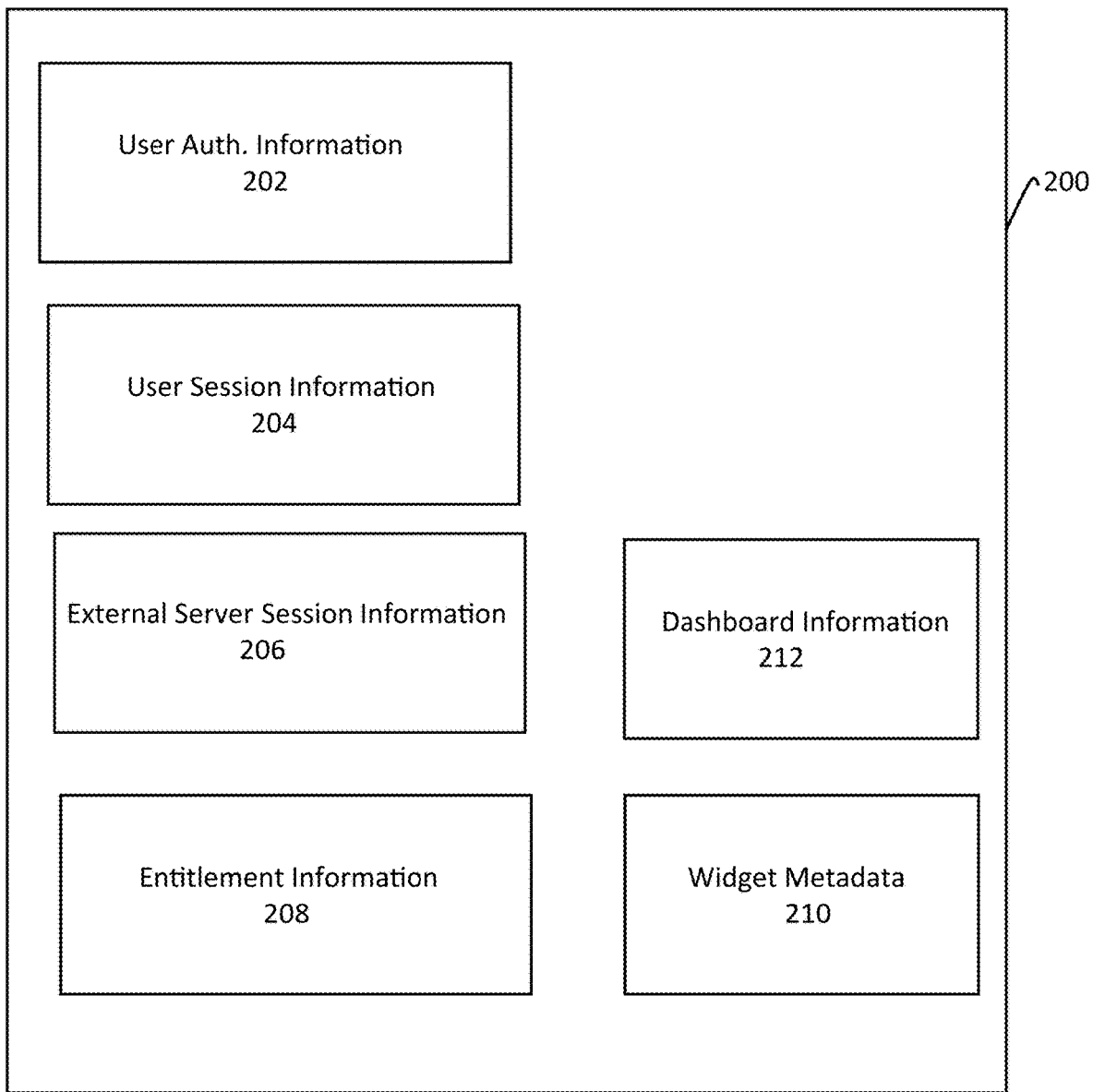
FIG. 2 illustrates example databased and/or data collections in a computing environment similar to that shown in FIG. 1, according to some example embodiments.
Figure 3:
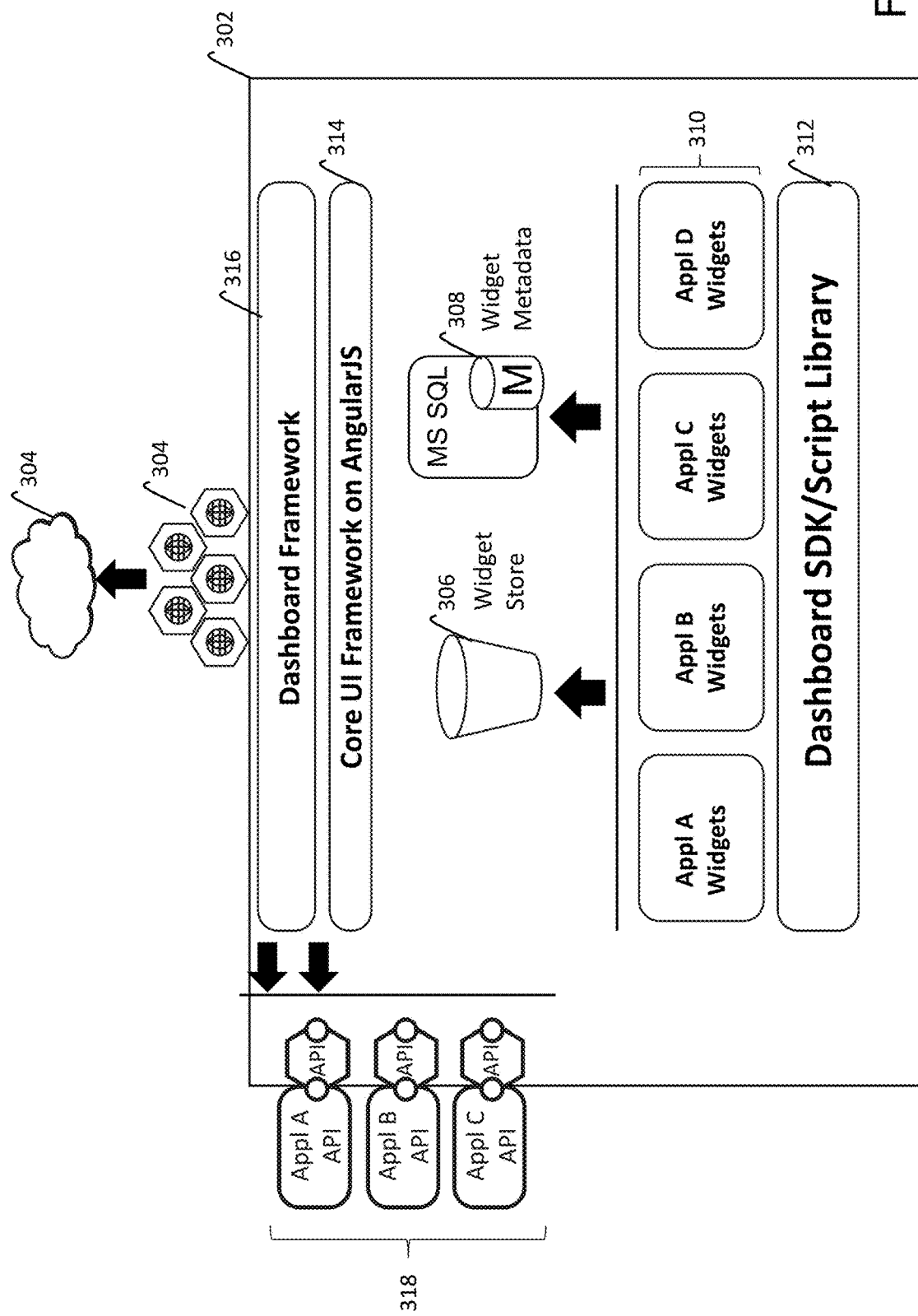
FIG. 3 illustrates a logical view of software components of the dashboard management system's dashboard environment, according to some example embodiments.
Figure 4A:
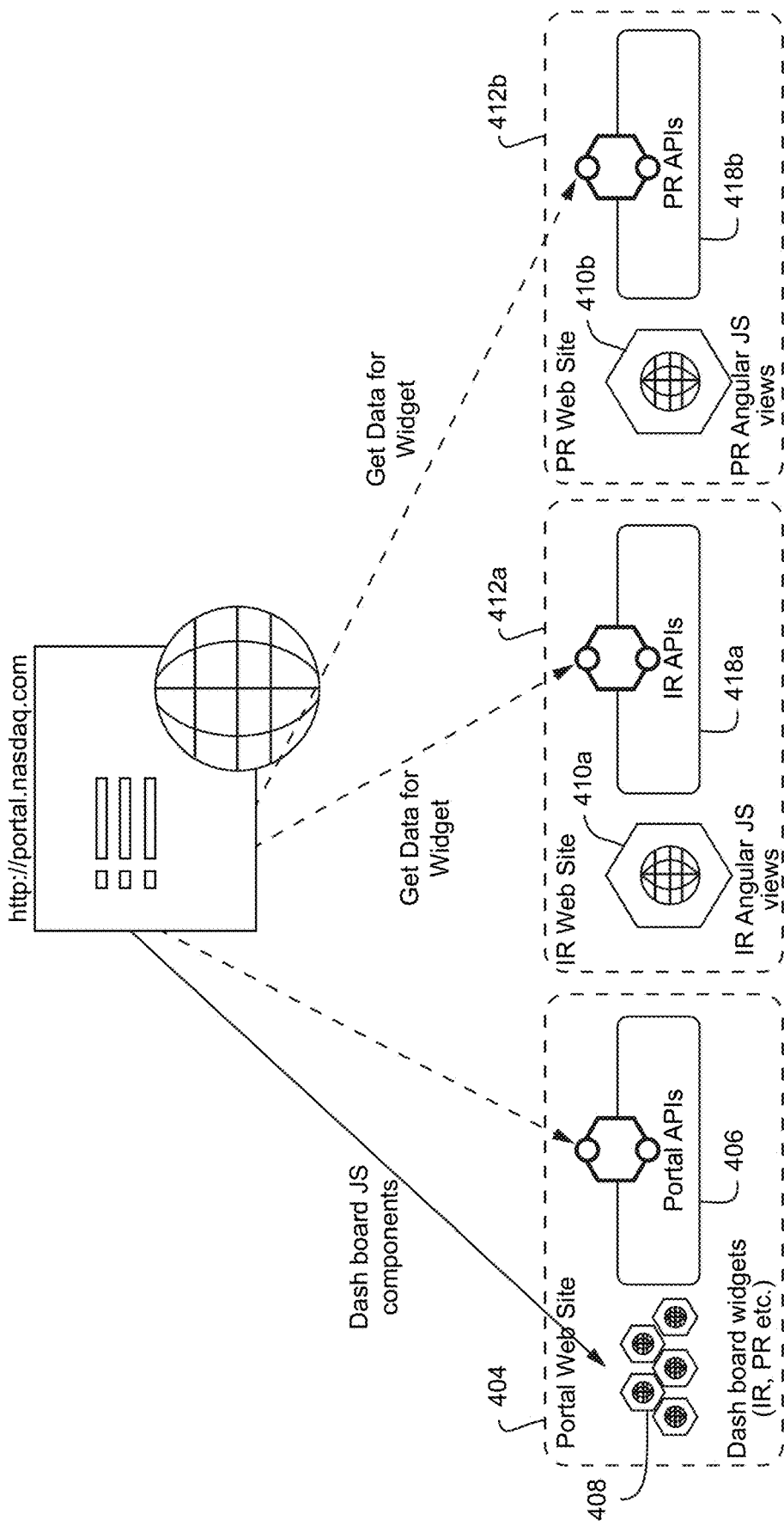
FIG. 4A illustrates a logical view of interactions between the portal web application and other web applications in the dashboard management system, according to some example embodiments.
Figure 4B:
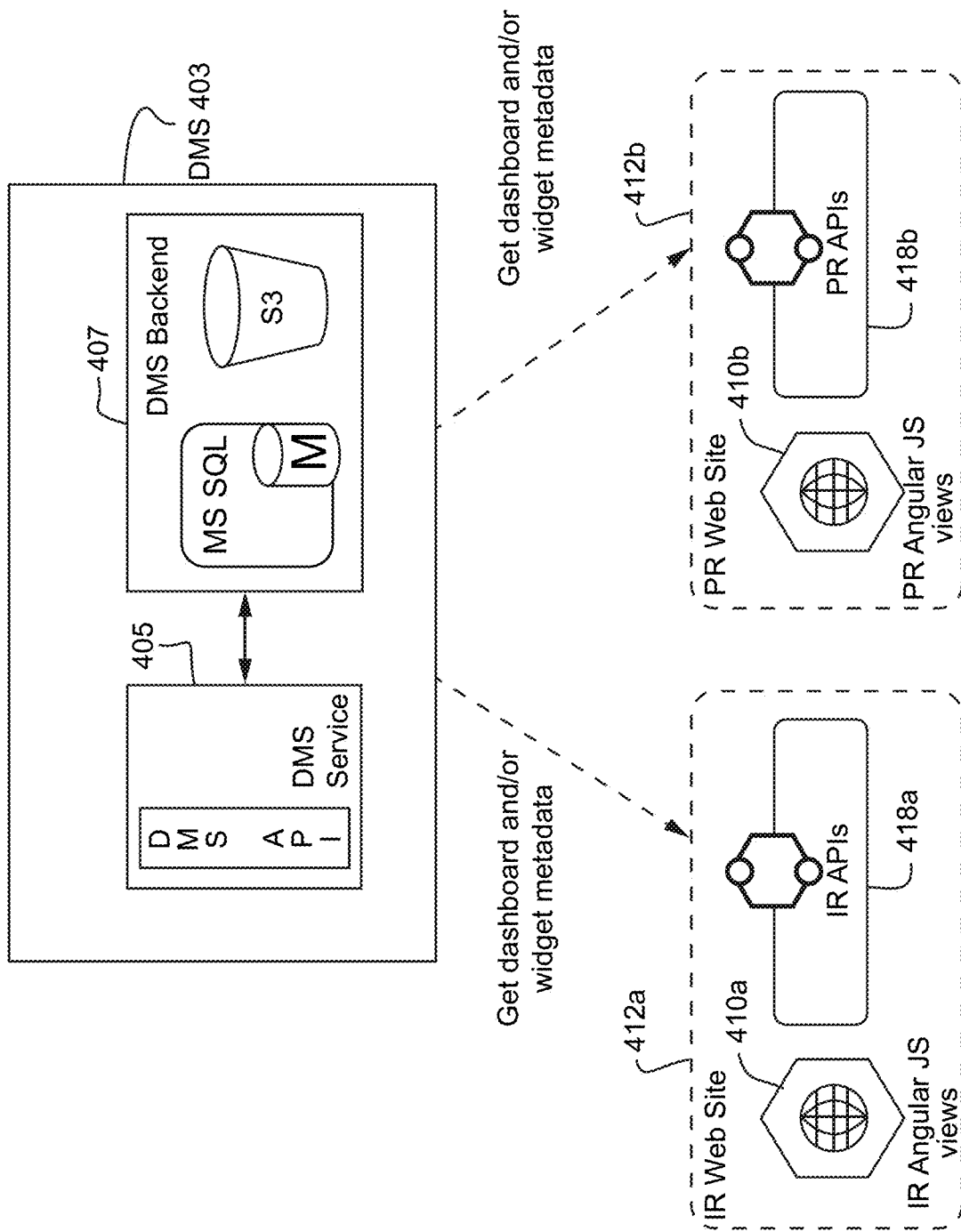
FIG. 4B illustrates a logical view of interactions between a dashboard management service and other web applications in the dashboard management system, according to some example embodiments.
Figure 5:
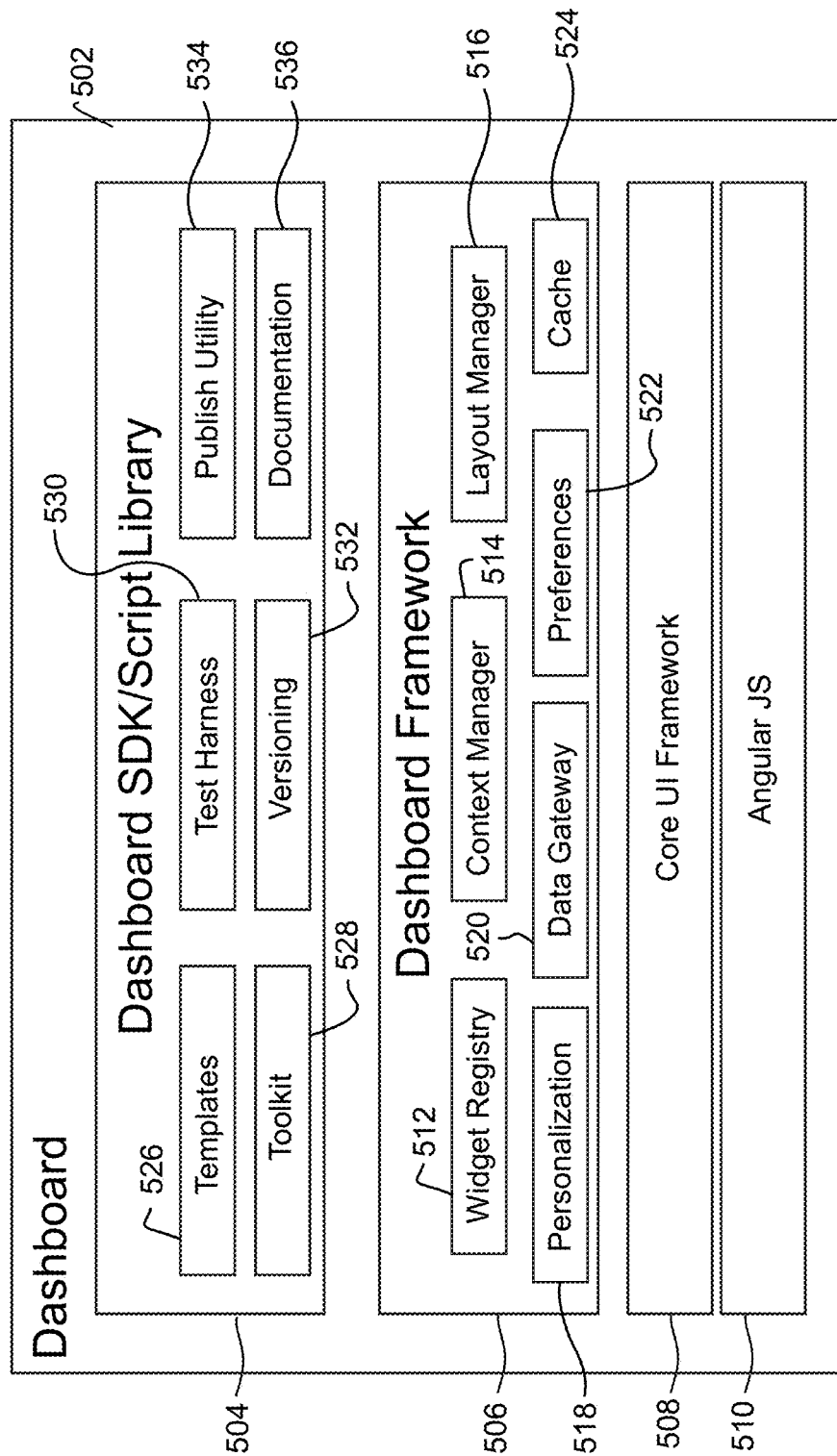
FIG. 5 illustrates a more detailed view of the logical view shown in FIG. 3, according to some example embodiments.
Figure 19A:
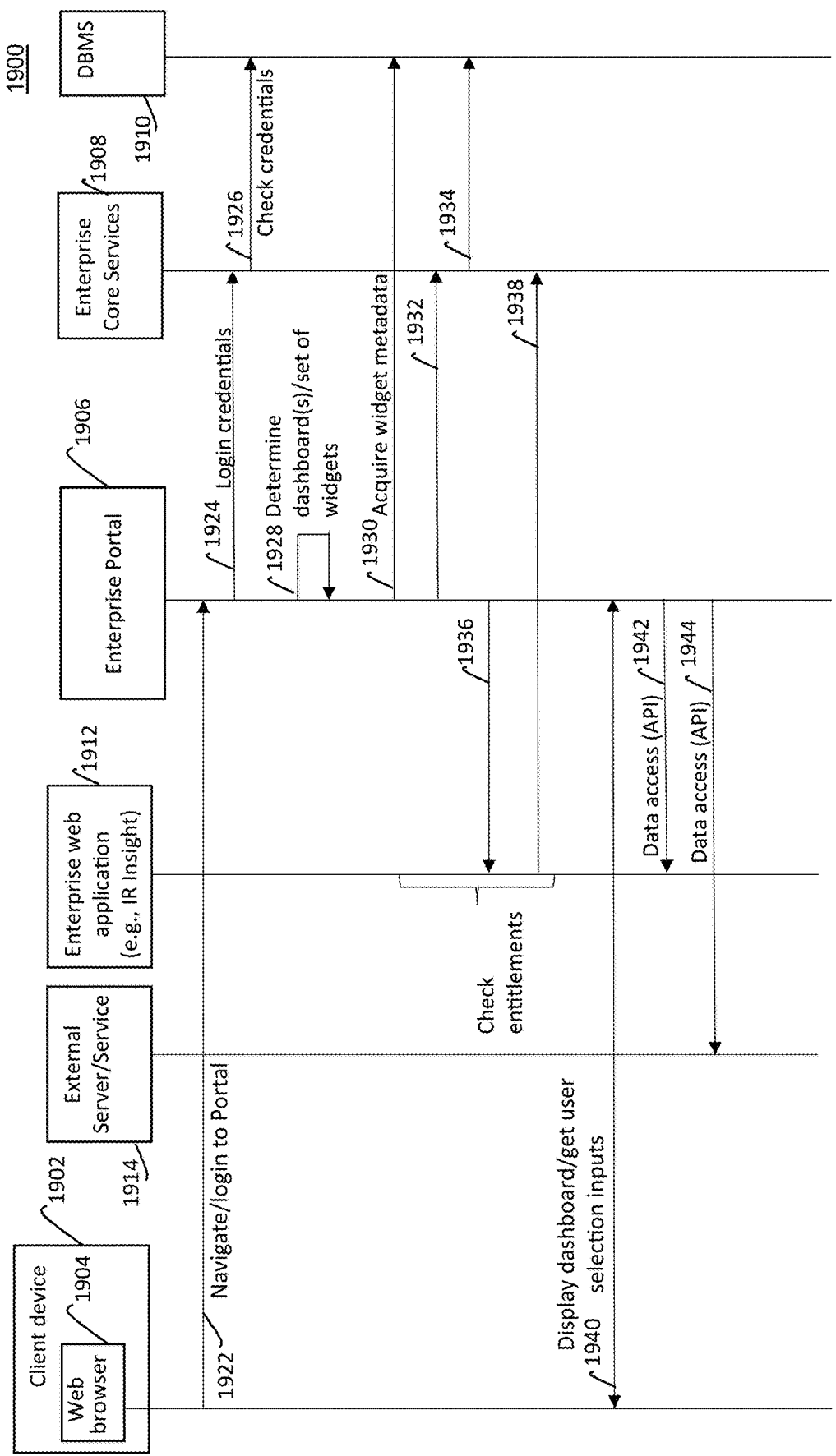
FIG. 19A illustrates an interaction diagram showing interactions relating to a user using a dashboard in the portal web application, according to some example embodiments.
Figure 19B:
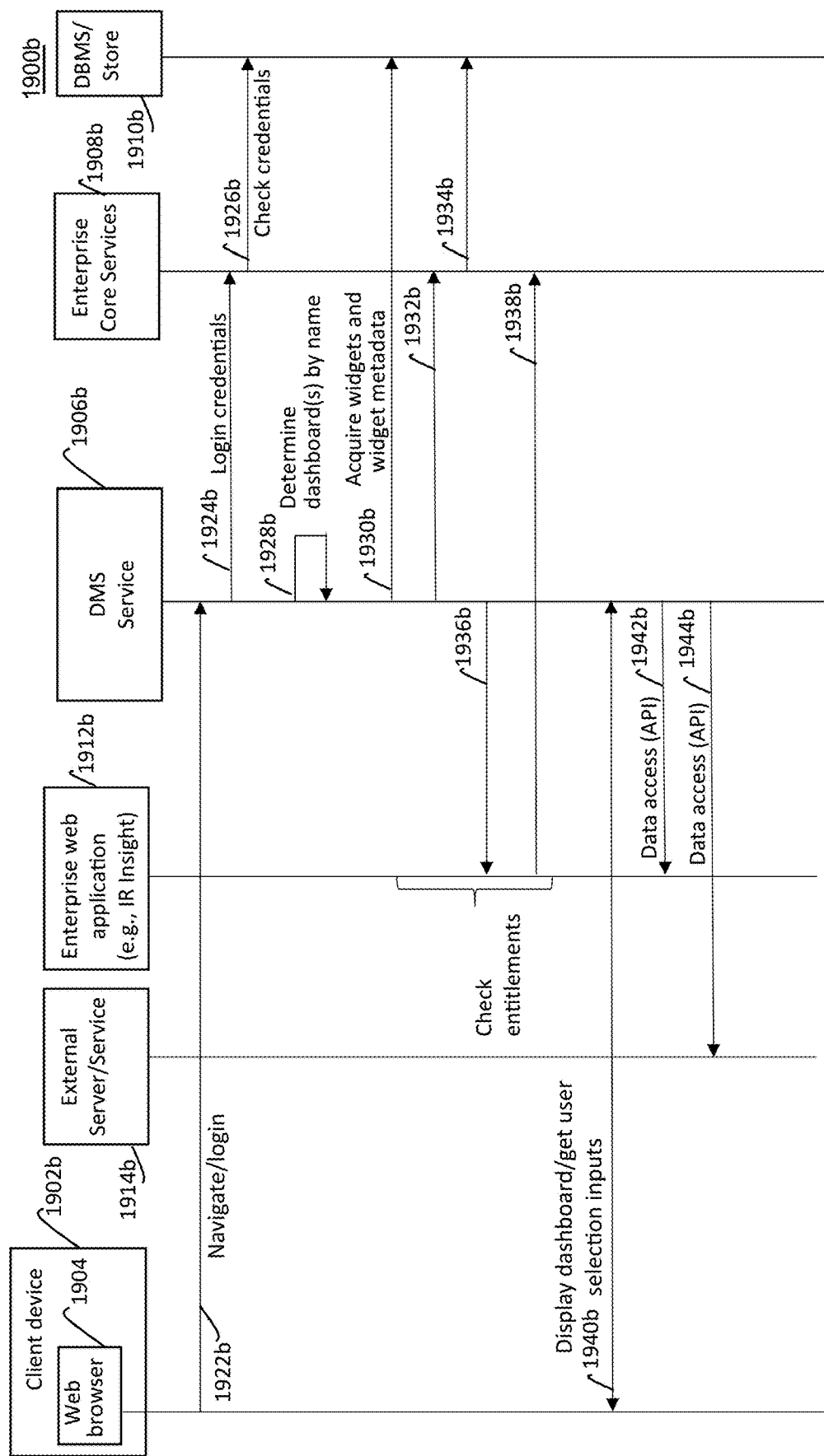
FIG. 19B illustrates an interaction diagram showing interactions relating to a user using a dashboard in the dashboard management service, according to some example embodiments.
Figure 20A:
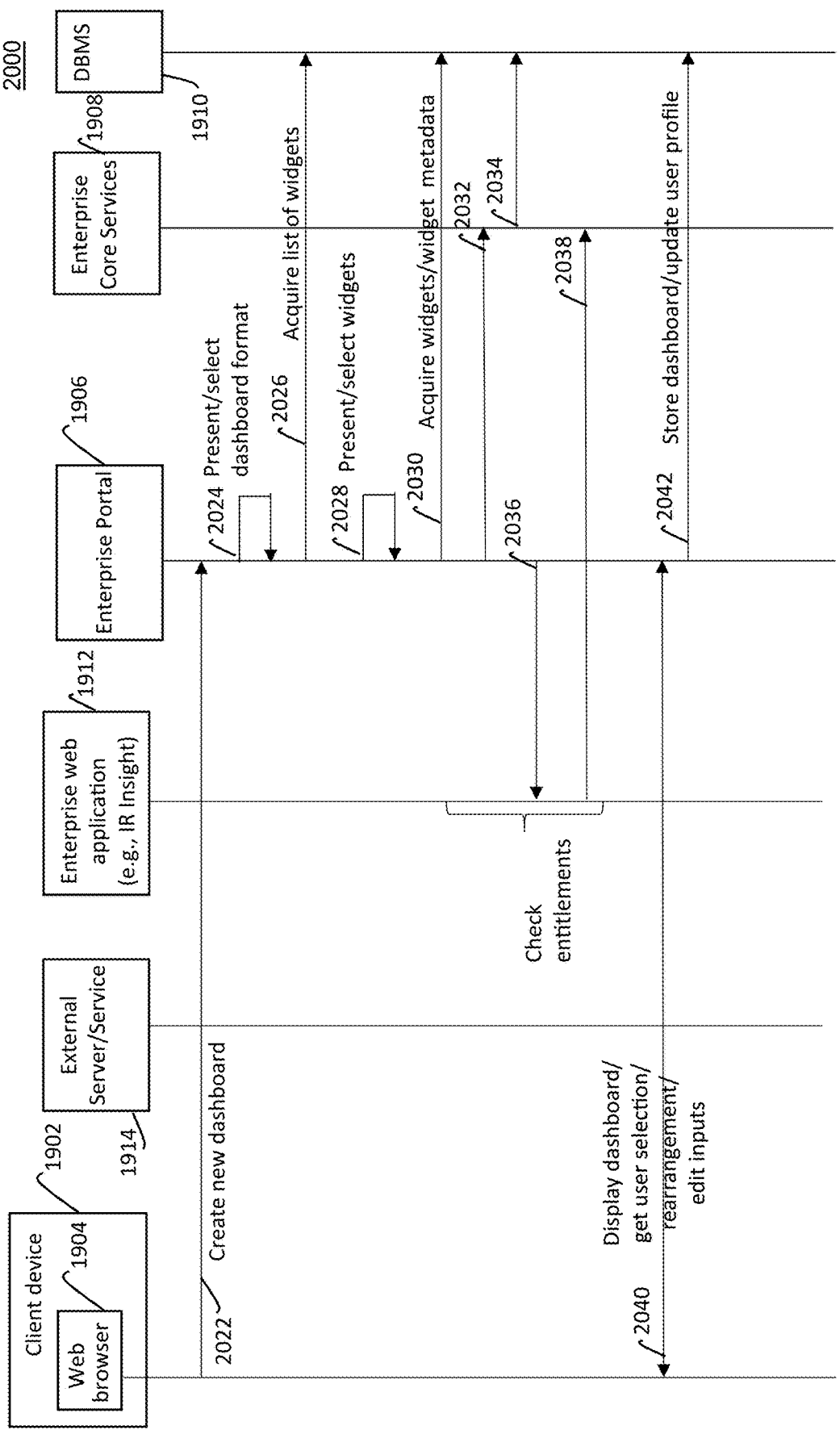
FIG. 20A illustrates an interaction diagram showing interactions relating to a developer creating a new dashboard in the portal web application, according to some example embodiments.
Figure 20B:
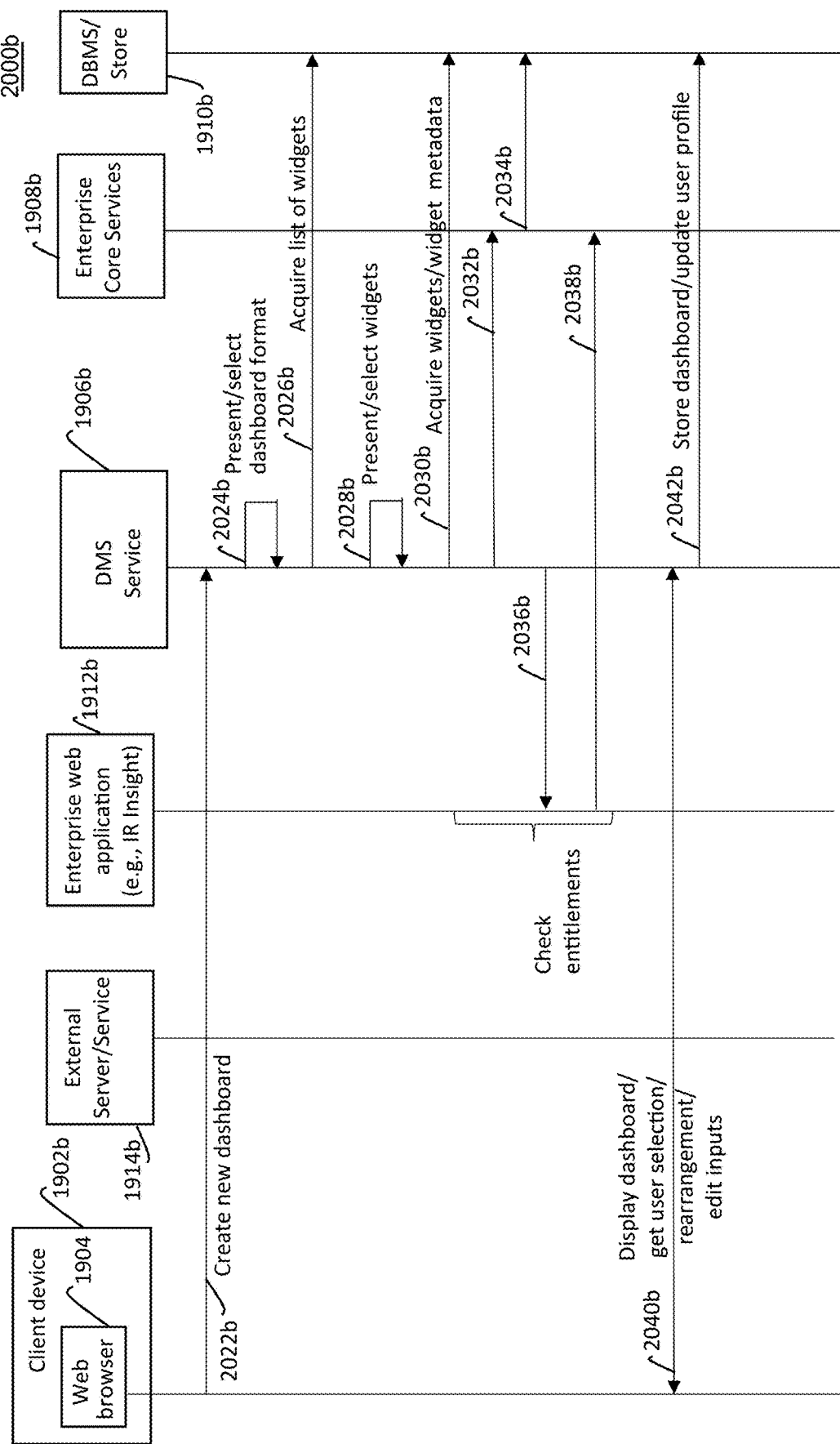
FIG. 20B illustrates an interaction diagram showing interactions relating to a developer creating a new dashboard in the dashboard management service, according to some example embodiments.
Figure 21A:
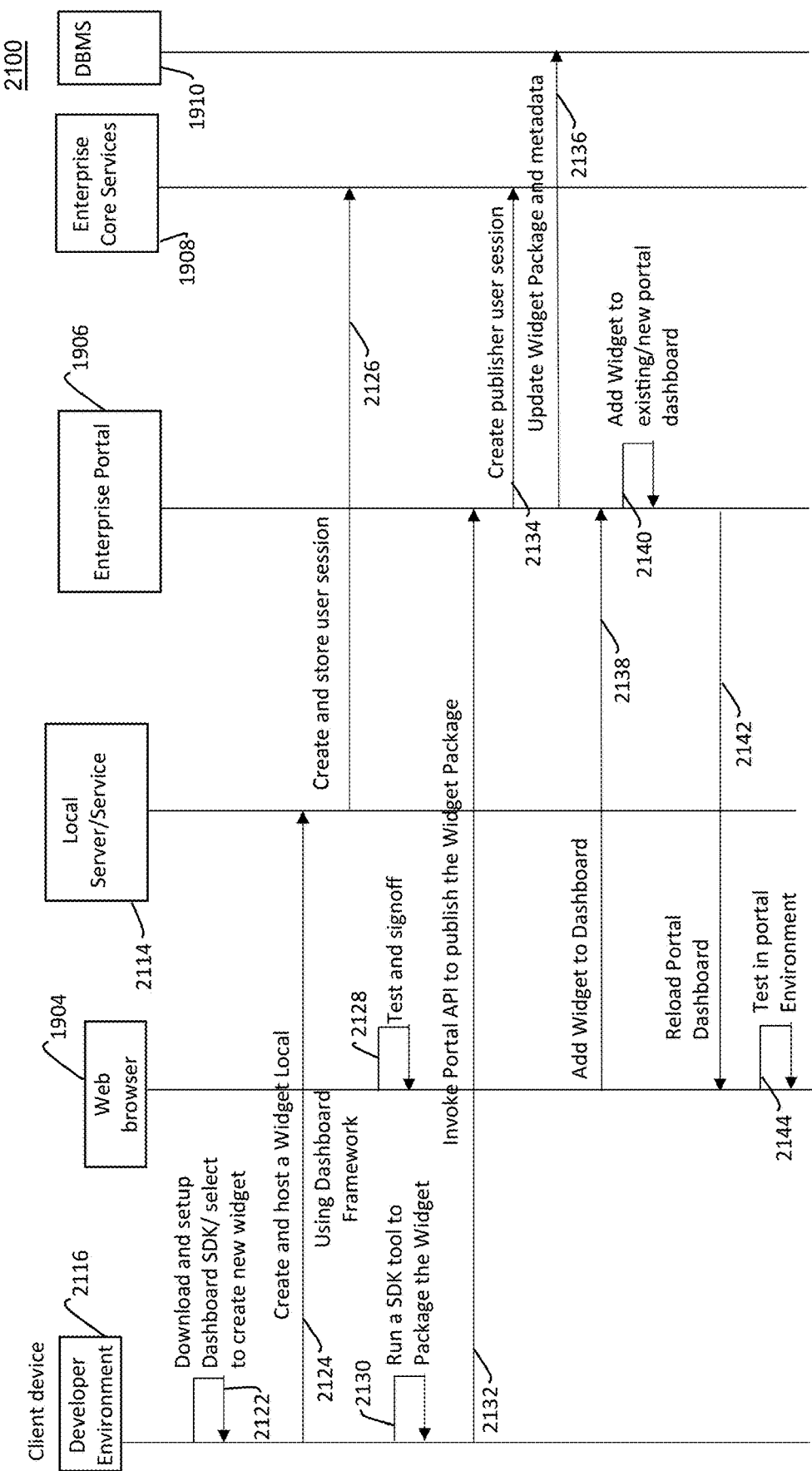
FIG. 21A illustrates an interaction diagram showing interactions relating to a developer creating a new widget in the portal environment, according to some example embodiments.
Figure 21B:
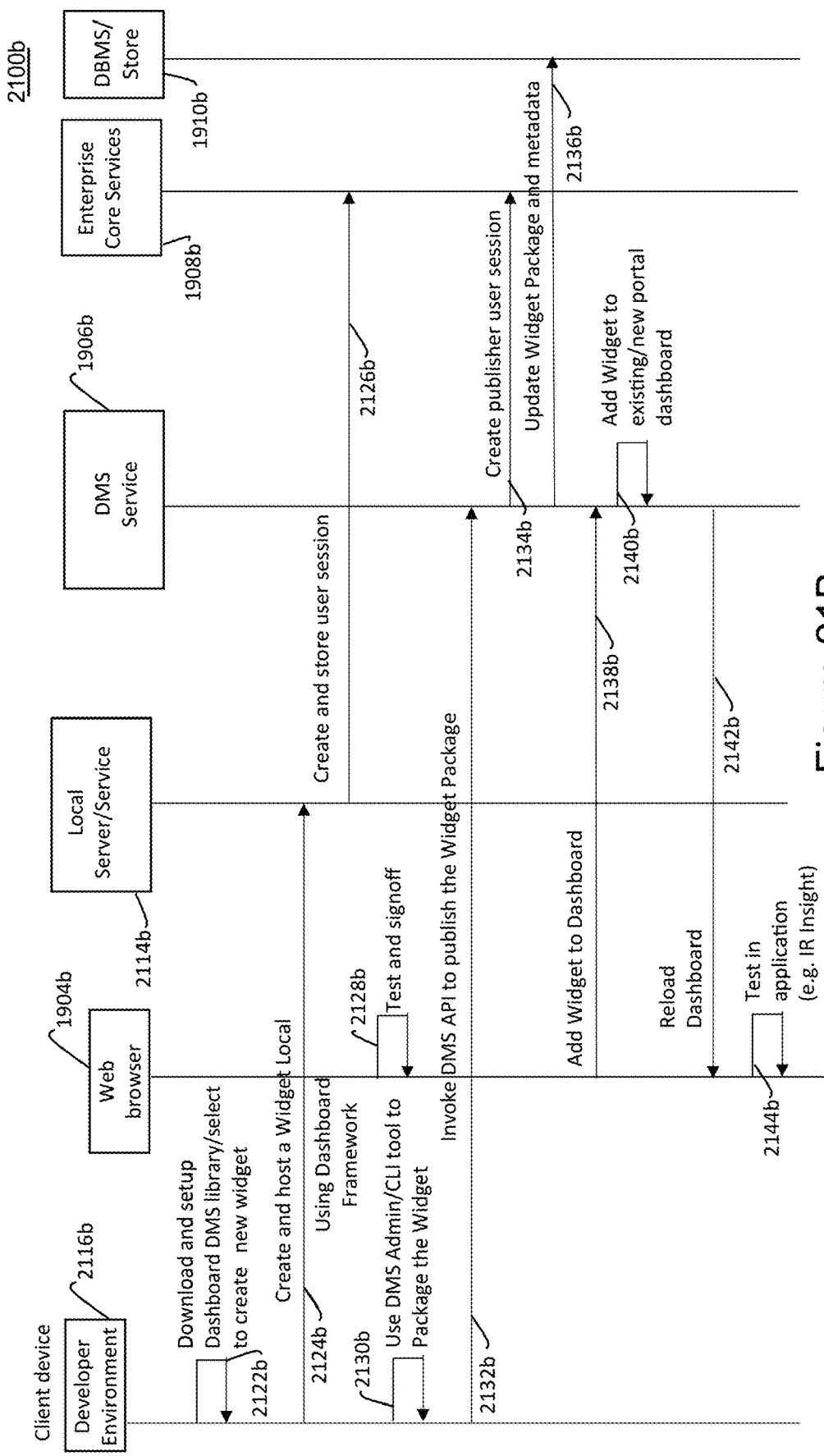
FIG. 21B illustrates an interaction diagram showing interactions relating to a developer creating a new widget in the dashboard management service environment, according to some example embodiments.
Figure 22:
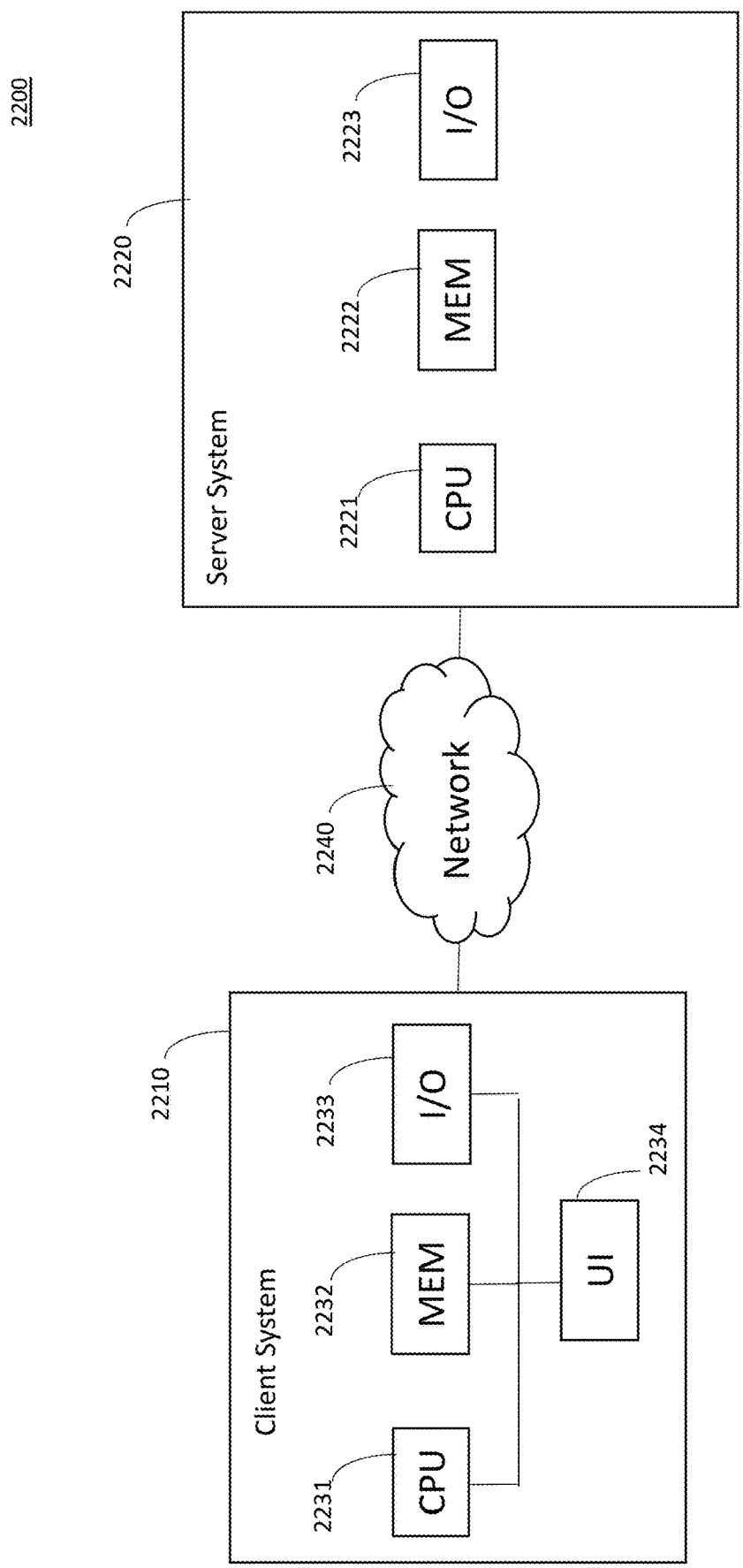
FIG. 22 schematically illustrates a computing environment in which the client devices and/or servers can be implemented, in accordance with some example embodiments.

FIG. 1 illustrates a computing environment of a dashboard management system having one or more client devices configured to execute one or more of an event application client and a web application client, and one or more server devices executing web application server components and a portal application and/or a dashboard management service web application, according to some example embodiments. The portal application and/or a dashboard management service web application provide improved capabilities of dashboard creation, sharing and management in enterprise applications. Some example embodiments may have only one of portal application and/or a dashboard management service web application operations. FIG. 2 illustrates example databases and/or data collections in a computing environment similar to that shown in FIG. 1, and FIG. 3 illustrates a logical view of software components of the FIG. 1 dashboard management system's dashboard environment. FIGS. 4A and 4B show a portal application based embodiment, and a dashboard management system environment based embodiment, respectively, for facilitating dashboard creation and management. FIG. 5 illustrates a more detailed view of the logical view shown in FIG. 3. FIGS. 6-18 illustrate various dashboard development/display interfaces, snippets of code, database structures for managing dashboard and widgets, and container organizations used in various embodiments. FIGS. 19A, 20A and 21A provide example activity flows for interactions relating to a user using a dashboard in the portal web application, interactions relating to a developer creating a new dashboard in the portal web application, and interactions relating to a developer creating a new widget in the portal environment. FIGS. 19B, 20B and 21B provide example activity flows for interactions relating to a user using a dashboard in the dashboard management service environment, interactions relating to a developer creating a new dashboard in the dashboard management service environment, and interactions relating to a developer creating a new widget in the dashboard management service environment. FIG. 22 schematically illustrates a computing environment in which the client devices and/or servers can be implemented according to example embodiments.

Description of FIG. 1

FIG. 1 illustrates a computing environment in accordance with certain example embodiments. The non-limiting computing environment 100 includes one or more servers 102 (also referred to herein as "server infrastructure") and one or more clients 104. The one or more servers 102 communicate with clients 104 and one or more external servers 106, so that users on clients 104 can access and use web applications 112 executed on the one or more servers 102. Servers 102 may also communicate with one or more internally used systems such as, for example, a document management system 108. The communication between the servers 102, clients 104, external servers 106, and document management system 108 may be over the internet or any other communication network.

Servers 102 may be implemented on one or more physical server computers that are communicatively connected to each other over a network. The one or more physical server computers may be geographically co-located or distributed. Servers 102 may include a database management system 110, one or more other server-side web applications 112 (e.g., 112a and 112b) and a core services application 114. Server 102 may also include a portal web application 111 (sometimes referred to herein simply as "portal") and/or a dashboard management service 113.

Each web application 112 (and also portal application 111 and/or dashboard management service 113) may be designed and operated according to a three-tier model of a web server, application server and database. As in conventional systems, the web server of each web application 112 includes the capability to communicate with external entities via HTTP and other protocols such as JSON, HTML, XML, JavaScript, Cascading Style Sheets (CSS), etc. The application server of each web application 111 and 112 provides the processing logic for the application, and the database of each web application 111, 113 and 112 provides for storing and reading data.

Web applications 111, 113 and 112 may interact with the core services application 114 for managing user authentication, with clients 104 (e.g., 104a and 104b) for receiving input from and for transmitting out to, and the database management system 110 and/or external servers 106 for obtaining information to be provided to the requesting client applications running on clients 104. In some embodiments, some or all of the information provided to requesting clients may be generated by the web application itself and/or other web application executing locally on the same one or more servers 102.

Core services application 114, which may also be designed and operated according to the three-tier model described above, may provide one or more services that are commonly used by the web applications 111, 113 and 112. Example services that may be provided by core services application 114 include authentication of users, management of sessions, etc.

In some embodiments, core services application 114 provides session management to the external servers 106. For example, in a use case where two or more web applications 111, 113 and 112 obtain data from a particular external server 106, core services application 114 may provide the capability to manage sessions between servers 102 and the external servers 106 (referred to as "external server sessions" or "vendor sessions") in accordance with corresponding other sessions between clients 104 and servers 102 (referred to as "user sessions" or authentication sessions"). Each external server may store a copy 119 of a part of an external server session table maintained at the server 102.

Web applications 111, 113 and 112 operate to receive requests from clients 104, perform processing and/or obtain information from the database 110 and/or external servers 106, and respond to clients 104 with a result from the processing and/or obtained data. Web applications 111, 113 and 112 may utilize core services 114 for administering users, entitlements, user sessions and/or external server sessions, and the like.

A web application, such as any of web applications 111, 113 and 112, may comprise one or more client-side components and one or more server-side components. Client-side components of a web application may operate to provide for handling the user interface by performing presenting (e.g., displaying) of information on a user interface device; receiving user input, etc. Server-side components may provide for authentication, service metering, generating or obtaining information to be presented to the user in accordance with received user inputs.

Embodiments are not limited to particular types of web applications. Web applications that may be used in embodiments include those designed according to the single page application (SPA) model, any non-SPA model, or a combination of both.

SPAs are web applications that operate within a single web page. In an SPA, the content for a single web page is sent by the web server to the web browser, and that page is loaded/rendered, as described above with the traditional web application. Subsequently, when the user wants to view different content within the application, the user will click a hyperlink or input on the page. But instead of navigating to a different page as in non-SPA web applications, the same page will remain loaded, and its content will be dynamically updated. This dynamic updating may be accomplished in a number of different ways; it may involve, for example, the web browser performing background HTTP fetches for new content, updating the Document Object Model (DOM) of the page (via JavaScript code), and/or other techniques.

AngularJS® is a web application framework that is used to create SPAs. At the web browser, AngularJS JavaScript libraries are loaded and interpret HTML templates which are embedded with AngularJS scripts and other AngularJS coding constructs, such that the resulting pages behave as defined in the templates. Other frameworks (e.g., Backbone.js, Ember.js, and React) may also be used for SPA applications.

In some non-SPA web application models, a web application includes a number of different web pages. To render a particular web page within the application, the following set of interactions is performed: a web browser at a client device requests (using an Hypertext Transfer Protocol (HTTP) message) a particular web page from a web server; in response, the web server transmits (using HTTP) the code for the page back to the web browser, the code including, e.g., HTML, JavaScript®, and Cascading Style Sheets (CSS) code; the web browser then loads the code and renders the page, thereby enabling a user to view and interact with the page. When the user subsequently wants to view different content within the application, the user will click a hyperlink or input on the page that points to a different page within the application, and then the above-mentioned request/response/load/render procedure is performed for the different page.

The database management system 110 (sometimes also referred to herein simply as the database), may be a commercially available DBMS, or other data record management system. Although shown as a single DBMS, DBMS 110 may include one or more separate databases. Embodiments are not limited to any type of database management system.

Clients 104a and 104b can be configured to execute the same or different client applications. In the illustrated example embodiment in FIG. 1, first clients 104a includes a web browser A 116. Client 104a may also have stored on it a client-side app 120 which is a native app. When browser A 116 is used to access a web application 111 or 112, client-side code 118 for a web application 111 or 112 executed within browser A 116. In the same example embodiment, the second client 104b is configured to execute an app 121 which may be a native app. Client 104b may have one or more browsers 117 in addition to the native app 121. The client-side code 118, 119 and apps 120 and 121 may perform client-side processing for a corresponding web application on server 102.

As illustrated in FIG. 1, when a client application (e.g., 118/119 or 120/121) communicates with a web application 112, the web application 112 may obtain any information requested by the client from one or more external servers 106 and provide to the client application. In some embodiments, some or all of the information provided to the requesting clients 104 may be generated locally by servers 102.

Clients 104 may include personal computers, mobile computers, tablets, smartphones, and other electronic devices. In some example embodiments, any electronic computing device including at least a display, an input device for user input, and a communication interface for communicating with the server device may operate as a client device.

The external servers 106 (e.g., 106a, 106b, 106c) may include one or more servers controlled by an entity (e.g., administrative entity) different from the entity controlling the one or more servers 102. For example, one or more of the external servers 106 may be managed by a service provider or vendor that, under a predetermined (e.g., previously agreed upon by an enterprise and a vendor) service specification, provides users on client devices 104 access to various application data and/or analysis. The service specification may be based upon conditions relating to one or more of a number of users, type and amount of information, duration of use, frequency of use etc., of the access to the external servers.

It should be understood that the software modules shown in FIG. 1 are stored in and executed by hardware components (such as processors and memories), and it should be further understood that, whenever it is described in this document that a software module performs any action, that is done solely for ease of description, and the action is in actuality performed by the underlying hardware according to the instructions and data that comprise the software module. Further details regarding example hardware components that may be used to implement the features described herein are provided below with reference to FIG. 22, as well as in other places in this document.

In an example implementation, the computing environment 100 may be associated with an enterprise, such as, for example, Nasdaq Corporation. Example web applications 112 may include real-time market analysis application (e.g. IR Insight™) and a client account status application. The portal web application may enable users to access selected functionalities of at least some web applications 112, in addition to its own functionalities. In some example embodiments, the user interfaces rendered on each client 104 by the web applications 111 and 112 may include dashboards.

A dashboard is a type of web component delivered by the dashboard framework, which can wrap more than one child components and render them in a predefined (but which can be manipulated at runtime) format. The dashboards may be rendered when accessing the web applications view the browser or the native app running on the respective clients. Each dashboard, in some example embodiments, may include an arrangement of widgets and/or cards (collectively referred to herein as "widgets") in an SPA. A framework (e.g., dashboard framework) may control the way in which the widgets are rendered. Portal web application 111 may also enable users to create or modify a dashboard, and to create and publish widgets. In some other embodiments, web applications may develop dashboards by using facilities provided by a DMS environment.

Users of web applications 111 and 112 may include financial analysts and/or other employees of the enterprise. Core services application 114 may provide common services such as administration (e.g., creating user accounts, administering entitlements, etc.) authentication (e.g., create/manage sessions for users to access certain services, etc.) and authorization (e.g., check whether user is entitled to access certain services or features, etc.) for users. Core services application 114 may, among one or more other processes, include an entitlement control process 122 which provides for administering entitlements by, for example, providing for updating a database (not shown separately in FIG. 1) with the current status of respective entitlements. In some embodiments, entitlement control 122 may provide for maintaining one or more data structures representing selected entitlements, for example, in tables 119 on external servers and/or tables 210 (shown in FIG. 2).

Servers 102 may represent one or more servers and the associated infrastructure used by the enterprise for running web applications 112, core services application 114 and associated software. The document management system 108 may include a customer relationship management application that communicates with the web applications and/or core services application for delivering services to the enterprise's users.

In this example implementation, external servers 106 each may be operated by a respective vendor of application data. Each vendor may provide application data such as real-time financial market related information to entities such as Nasdaq Corporation under some sort of subscription or service specification (e.g., an agreed price based upon type of data, amount of use, number of users, etc.).

When an analyst using client 104a accesses the real-time market analysis application on servers 102, an SPA may be displayed on the client device, and various real-time or value-added information from the vendors (e.g., such as those operating external servers 106) and/or the corporation's internal analysts etc., can be displayed in the one or more portions of the displayed SPA.

External servers 106 (e.g., vendors), although providing information requested users and capable of identifying the users accessing its services, may rely upon the enterprise (e.g., as the "vendor of record") to ensure users' compliance with the terms of use specified, for example, in a service specification agreed between the enterprise and the vendor associated with a particular external server 106. For example, based upon the agreement with a particular vendor, the core services application may be used to assign entitlements (a specification of one or more of, where or not a particular data stream or set of data streams are accessible, type/amount of data accessible, web application through which the data can be accessed, and other restrictions, if any) to the users and/or web applications to access/obtain data from that particular vendor. Core services 114 may maintain a table 121 of user sessions. Core services 114 may establish sessions with external servers 106 for respective users who have a valid entitlement to a particular external server's data. A table of external server sessions 123 may be maintained by core services application 114. Core services application 114 may cause, or may maintain, at least a part of external server session table (e.g., table 119) at each vendor. When a user of a client device 104 requests data from the vendor, for example, through one of the web applications on server 102, the vendor may, in some embodiments, check its copy of the session table and request core services 114 for verification that the requesting user's entitlement (e.g., the one or more active entitlement records assigned to that user) is valid, and would provide the requested data if the entitlement is valid. In some embodiments, the external server 106 may provide the requested data after checking the entitlements for the user in its local copy of the external server session table 119 and without further checks with server 102. In yet other embodiments, an external server 106 may provide the requested data, without checking its local memory for the user's entitlements, after checking with server 102 as to whether the user has a currently active entitlement for the requested data. These checks may be performed for every data request or only for requests for selected data.

In many places in this document, including but not limited to in the above description of FIG. 1, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 22.

Description of FIG. 2

FIG. 2 illustrates an example collection of data tables 200 that may be maintained by and/or is accessible to core services application 114, according to some example embodiments. Although referred to as "tables", the data discussed in relation to FIG. 2 may be stored in a memory in any form or data structure accessible to core services application 114 and/or other application configured to make use of the data.

User authentication information 202 may include a table of user authentication information, that is accessed by the core services application 114 in order to authenticate a user during, for example, sign-on to one or more web applications. For each user, identifying information, such as, for example, any of user Id, password, user-specific cookies, and/or entitlements associated with the user etc. may be maintained in user authentication information 202.

User session information 204 includes a record of the currently active sessions (as noted above, referred to herein as "authentication sessions" or "user sessions") by which users, such as users on client devices 104, communicate with a web application on server 102. User session information 204 may be in the form of a table with each row representing an active session. In some embodiments, inactive sessions (e.g., recently deactivated/cancelled sessions) too may also be in the table. The user session information table 204 may include, for each session, attributes such as user Id, web application for which the session serves, client, authenticated session identifier and/or one or more cookies. The table may also include start and end times for the session, and a current status. The status may, for example, indicate whether the session has been terminated or is currently active, and if terminated, a reason for the termination.

External server session information 206 stores the sessions (as noted above, referred to herein as "external server sessions" or "vendor sessions") pertaining to the respective external servers 106. In some embodiments, external server session information 206 may be maintained in data structures for each external server 106. In some embodiments, each table 206 or portion thereof can be provided to an external server 106 so that the permissions and/or entitlements associated with a request can be checked locally by the external server when the request is serviced. In some embodiments, sessions between the server device 102 and external servers 106 may be based on user session information 204, and a separate table may not be necessary. Attributes stored for each external server session may include attributes such as user Id, an external server session identifier, start and end times for the session, and a current status. The status may, for example, indicate whether the session has been terminated or is currently active, and if terminated, a reason for the termination.

Entitlement information 208 includes information regarding entitlements associated with access to the web applications and/or features thereof. Entitlements, as described above, specify the scope of access to one or more external servers/services (or other resources) for a user or group of users. For example, a row in a table of entitlement information 208 may specify the external servers (vendors) and the types of data to which a particular user or group of users have access. Entitlements may also specify whether simultaneous access by more than one client application (e.g., simultaneous access via a browser and a native app) by the same user is allowed for a particular web application. Entitlements may also specify volume and time constraints on the access/use of data from a particular external server. Such constraints may include, for example, time-based limits on accessing certain data types and/or how frequently such data can be accessed.

Entitlement information 208 may be maintained by an entitlement control system 122. The entitlement system 122 may interact with other systems such as an order fulfillment system (not separately shown) that manages orders for data from external servers. In some embodiments, the order fulfilment system may specify types and amounts of services provided by a vendor, which may be stored in a fulfillment information table 210. The entitlement system 122 and/or core services 114 may configure entitlements corresponding to the services available, and provisioning a user (e.g., a user using a client device 104) to access, from a web application, data from one or more external servers 106 based on the configured entitlements. The provisioning may include, for the order, a step of creating an entitlement record (e.g., one or more rows in a table in entitlement information 208) and associating the user, the web application, and/or the external server with the created entitlement record. In other words, according to some example embodiments, core services 114, of which entitlement control 122 may be a part of, links a product, such as a web application 112, to a user who is then linked to one or more entitlements. The implementation of relating the product to the user who is then related to the entitlements, enables updating of active sessions with respect to entitlements when user events are detected. The provisioning may be performed prior to the corresponding user and/or vendor sessions are formed.

Widget metadata 210 includes supporting information for each widget. Each widget may be identified by a unique identifier, and may include metadata such as, but not limited to, title/header of the widget, footer of the widget, context in which the widget may be used, entitlement requirements of the widget, updated/refresh interval, default layout information, expiration information, etc.

Dashboard information 212 includes information about each created dashboard. Each dashboard may be identified by a unique identifier. That is, each instance of a dashboard may be uniquely identifiable even when the same dashboard on the same is used in two different applications by the same user. For each dashboard, information such as a layout, selection of widgets, web applications in which the dashboard is to be displayed, etc. may be configured or determined during operation of the system.

Description of FIG. 3

FIG. 3 illustrates a logical view of software components of the dashboard management system's dashboard environment 302, according to some example embodiments.

The dashboard management environment 302 provides tools 312, a widget library 310, AngularJS modules 314 and portal dashboard 316.

The dashboard management environment 302 may include a widget library 306 storing widget collections 310 from one or more web applications (e.g., web applications 111, 113 and 112). The widget library 306 may be considered a common store for providing widgets for use by, and for sharing between, different applications. The widget library 306 (also referred to as a widget repository or widget store) stores web components which can be developed and hosted in any web application and shared between different applications. In some embodiments, the widget library may include a centrally hosted instance and a web application that permits sharing the widgets/components with other web applications, thus enabling sharing and re-using UI and other components that are developed for a specific business case. For example, consider a news component developed using dashboard management service. In general, a news component takes certain input filters and shows a set of news headlines when it is placed in a dashboard. This business case is common for many products, such that, by providing the capability to set the default filter and an API endpoint which can provide news headlines (based on the consuming product), a customizable, re-usable widget is provided in a develop-once-and-use-many-times manner.

A widget metadata store 308 may include metadata information associated with each of the widgets in widget library 306. The widgets in the widget library may have been published by the user/developer, indicating that they are available for use by other users and/or other web applications. In certain example embodiments, the widget library includes only widgets that have been published to it after testing and review.

The dashboard SDK and/or script library 312, core UI framework 314, and dashboard framework 316 may include JavaScript, AngularJS libraries and Visual Studio tools. The SDK/script library may be made available in the portal web application and also be capable of being delivered as a NuGet™ or NPM™ package to developers for independent use in their development environment. In some embodiments, a script package ("dms.package.js") is provided a JavaScript library built over AngularJS framework. The DMS framework will be used as a platform to build and manage, web components and web applications. In some embodiments, the system facilitates development by adding the SDK/script library and/or a client portion of the DMS framework to the user's Visual Studio and adding a project template, in order to set up the development environment for developers. Additionally, once the widget is developed, the developer or product owner can package and publish the widget into the portal and/or to the DMS environment.

In some embodiments, a DMS script package ("dms.package") that is a JavaScript library built over AngularJS may be provided as part of the SDK. This library facilitates adding complete dashboards with little to no coding effort to any AngularJS projects. This library may provide a single platform to host and manage a web application with support for many features. This may be added as a module to an AngularJS module, so that the AngularJS module can take advantage of all framework related features, such as, those associated with services, helpers and directives. A single AngularJS module ("dms.package") can be added to any AngularJS application. A directive may be made available to make a simple AngularJS page as dashboard page ("dms-view"). It may include support for multiple widget and dashboard configuration systems. Some embodiments may provide a generic data service as part of a DMS service (see FIG. 4B), which will manage the widget data (alternatively or additionally, individual widgets can also manage data by themselves). A $dmsProvider may be made available to set different dashboard layouts and themes for the consumer. Context management may be provided by a service or data exchange system between hosting view and the widgets. A NuGet and npm package will be delivered.

A client side portion of the dashboard framework 316 may be configured to render views and other components based on an input data (model) which may be provided as a JSON blob with a predefined structure. The stored data from a dashboard management backend (e.g., such as dashboard management backend 407) with respect to a requested dashboard (e.g. requested by name/ID) may be fetched using a DMS API and made available in the client as a dependency. In another aspect, the client side framework may render a view which requires only the input JSON and which may be performed without any connection to the dashboard management backend.

Using the development environments set as discussed above (e.g., by installing the dashboard SDK and/or by adding the framework libraries), widgets may be developed independently of the portal. That is, once the development environment is set, the developer can develop widgets in their own project/product environment. Thus, the widget can be developed and viewed in the respective web applications (e.g., web applications 112) and also can be published to the portal web application (e.g., portal web application 111) and/or to the DMS environment (e.g., DMS 113).

In certain example embodiments, the widgets have no deployment dependencies. The widgets which are delivered through the portal platform or the DMS environment, may not require deployment to any specific environment, until there is an API dependency. For example, API dependencies may be independent of the dashboards and widgets, such that when there is, for example, a new version of an API, then it is the responsibility of the owner of widgets to support the new API when a need arises. The widgets developed using the dashboard SDK or DMS framework can be packaged and published into any specific environment of the portal and/or to the DMS environment and make it available for users. As in the case of a new package being published, the system may introduce a new version availability on the hosted environment. This enables the clearing of the client browser cache and makes the recently added/updated widget available for the user.

As in a real-time project development environment, embodiments may require that any widget developed is tested and approved before it is published to the portal production environment. In order to satisfy this, the dashboard management system may provide an option to publish a widget into any of one or more platform integration environments where testing and product teams can perform an integration testing before publishing the new widget to the production environment. The dashboard SDK/script library tools may provide similar functionality even when being used in other environments outside the portal.

Embodiments may enable authoring and approving widgets before going live, and support rollback. Because embodiments enable publishing widgets into different environments, the portal also provides options to preview and approve widgets before they made available for other users or applications. A versioning system may also provide the flexibility to make a specific version of a widget to be shown live, which in turn can be used to rollback or can be used to show different versions of the same widgets on dashboards.

Figure 10:
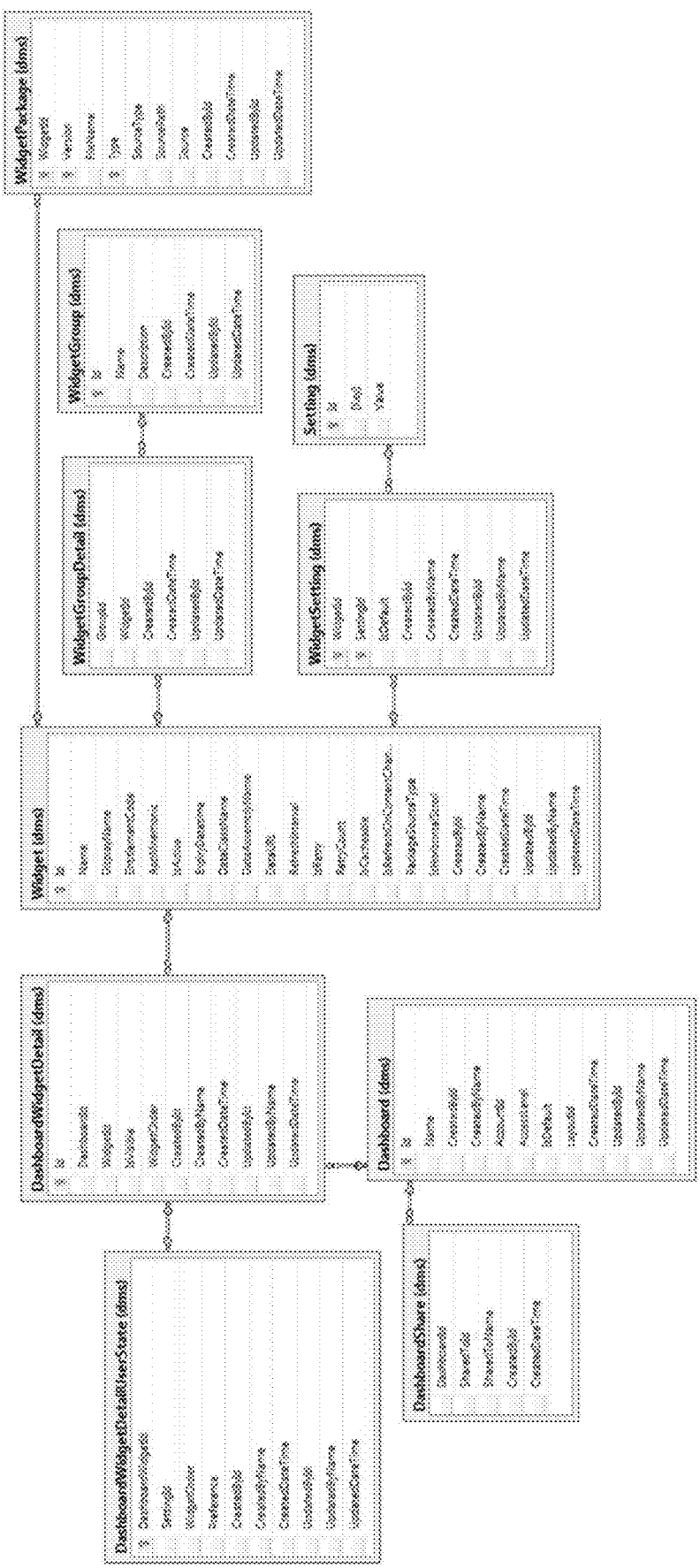
FIG. 10 illustrates an example database for maintain widget and widget metadata, according to some example embodiments.

Embodiments enable new widgets to be added to any dashboard or to remove a widget from a dashboard. Because deployment dependencies between widgets and the dashboards have been removed in some embodiments, dynamic addition and removal of new widgets is enabled. A product can have multiple dashboards depending on business requirements, and each dashboard may be identified by unique dashboard ID. The widgets can be added or removed from any dashboard based on the unique dashboard ID. The database schema shown in FIG. 10 shows how the dashboard and widgets are created and stored in a database.

When a widget is added or removed using UI features (using an interface to add/remove widgets) such as that provided by core UI framework 314, the dashboard management system may update the UI and save the current state of the dashboard to a database. If a new widget is added, the framework will show the widget in the UI and also make an API call to update the backend by pinning the dashboard and widget IDs. In the platform when a widget is added or removed using the UI features (there will be interface to add/remove cards) the DMS framework will update the UI and saves the current state of the dashboard to the database. If a new widget is added, the framework will show the widget in the UI and also make an API call to update the backend for the same Embodiments enable setting an expiry to a dashboard widget. In cases where there is a requirement to show a widget for only a certain time and discontinue showing after some time, an expiry date/time can be set against the widget. Once the widget expires, it may be removed from a specific dashboard without any additional effort by the user. For example, in some web applications there may be a need to show information about an event coming up in a future date and to use a widget to direct the user's attention to that event. In such cases, the user may add an expiry to the widget, so that once the event is over the widget can be removed from the dashboard.

Example embodiments also provide for layout re-alignment after the addition or removal of a widget. This capability facilitates dynamic addition and/or removal of widgets in dashboards. Thus, the way how the widgets are arranged in the dashboard layout can dynamically change with any removal and/or addition. The dashboard management system may include one or more default fixed layouts such as, for example, two column or three column layouts, and may also, in some embodiments, may provide for custom layouts with third-party tools such as, for example, Packery™ and Masonry™. Based on the chosen layout/tool, the widgets may get re-aligned over the dashboard when a new widget is added or a widget is deleted.

The tools 312 comprises a dashboard SDK. It may include packaging tools, publishing tools, APIs to manage widgets, and versioning and metadata system. There may be APIs and tools created to facilitate creating, packaging and publishing widgets and such tools may be part of the SDK and/or script library.

The widget library 310 may include widgets originated in, or provided to, one or more other web applications. The other web applications may be in the same domain—such as the same enterprise domain, or, at least in some embodiments, in other domains. The widget library may provide widget standards, facilities to create widgets, facilities to package and publish widgets etc. The provider of each widget may provide some or all of the metadata associated with that widget. Metadata may include, but is not limited to, widget header, footer text, data refresh interval, expiry date and etc. Each provided widget may be packaged and published to the widget library in an S3™ or other hosting environments, with all required metadata.

The AngularJS modules 314 may include the core UI framework on AngularJS. The module may provide settings providers, UI directives and services. This is an independent AngularJS library/module, which can be used by the portal or any web application view to create and render dashboards based on configuration. The module (e.g., dms.package) can be injected as a dependency to any AngularJS modules irrespective of the application view and can be used to configure and render dashboard layouts.

The dashboard framework 316 may include facilities to create and publish dashboards, render dashboards, add/remove widgets, manage layout (e.g., customize), copy dashboards, and to share dashboards and/or widgets. The database model may be structured to associate a dashboard against one or more users of the portal and/or the DMS. If User A creates a dashboard (e.g. a market monitor for equities markets), then User A can share the same with his peers or any other user of the portal and/or the DMS. Similarly, if User A is creating a new dashboard, rather than starting from scratch, he may copy from an existing dashboard and edit it. The dashboard framework 316 may include a dashboard app that is runnable in a shell environment.

A widget can be created independently in any development environment, as an AngularJS entity. Thus, each widget may have a template and controller. The developers can test the widget with a mock AngularJS module in the developer's own development environment. After the testing, the developer can use a packaging tool provided by the dashboard management system, to bundle and package widget and widget related files and dependencies. The package can then be uploaded along with the widget metadata into the portal, by a user interface (see e.g., FIG. 14) provided by the dashboard management system. In another embodiment, the widget and/or bundle is published/uploaded to the DMS environment such as DMS 113.

Embodiments may provide custom tools to enable a developer to perform bundling and packaging of a widget, by passing the source file path and widget definition. The tool may output the widget package (e.g. brokermanagement.package.js). The package can be then uploaded to the portal using an interface or an API. This API may take the widget identification and settings information along with the uploaded package.js, and publish that into the portal widget library.

All widgets may be uniquely identified by widget name. If any widget of same name has already been uploaded to the portal, then it may be over-written with the newly uploaded widget. In some embodiments, versioning of uploaded widgets may be supported. Upon successful upload, the uploaded widget may be seen in the list of widgets available in the widget library.

Tools provided in the DMS environment 306 may include a widget bundling and packaging tool, an API manage widgets tool, and a widget publishing tool (not separately shown in FIG. 3).

The widget bundling and packaging tool may include an executable or a Visual Studio plugin which operates to bundle all the scripts/static file dependencies for a particular widget. Thus, the packaging tools not only bundle the resource files, they also make certain configuration dependencies available for the framework. The tool may take as input, the widget physical location and dependency details, and may support order of files (e.g., template file dependency going the last). The bundled files may be also wrapped with some metadata which can self-explain the widget dependencies, and which forms the package.

Bundling may include several distinct aspects including, for example, template (HTML) bundling, Javascript bundling and support of wildcard characters.

The template bundling may include concatenating all the html files of a widget and adding to a $templateCache and making it available for the widget. In some example embodiments, this may be performed by caching the template files against a selected global module, but this may create a dependency to other modules. Therefore, in other example embodiments, it may be more desirable to take UiBootstrap tpls approch, where each template is cached against a dynamic module name. (See e.g., FIG. 15). This creates a module and cache with the same name.

The Javascript bundling may include a normal bundling process of script files which uses one of the standard NPM module to perform the task, along with the support to wildcard characters. Developers may impose the order of files to be concatenated.

After the above two operations, both the concatenated files are merged into one. A minification/unglify task may be performed over the merged file to produce the package. The package may then be uploaded to portal and/or via the DMS service to the common store (e.g., the packages in the common store can be consumed by different products which integrated the DMS Hosting container).

The dashboard management system may also provide an API (referred to herein as the "manage widgets" API) to add/edit/remove widgets from the portal widget library. A widget publishing tool may provide an interface (support UI) to use the manage widgets API which facilitates developers to upload widget packages to the portal and add widget metadata. (See FIG. 16).

Description of FIG. 4

FIG. 4A illustrates a logical view of interactions between the portal application 404 and other web applications 412*a* and 412*b* in the dashboard management system, according to some example embodiments.

The browser 402 may render the portal web site 404 by rendering a dashboard in the browser. The dashboard renders widgets 408. Widgets 408 includes widgets published to the portal from other web applications 412*a* and 412*b*. The dashboard operates by calling, from respective widgets, the API's 406 provided by the portal web site and APIs provided by other web applications 418*a-b*. Each web application 412*a-b* may have its own AngularJS view(s) 410*a-b* that are provided to the browser 402. Although not shown, the portal application may have one or more views of its own. In some example embodiments, other web applications, through their respective dashboard views, may access the widgets uploaded to the portal and/or other widgets hosted in that application's environment.

Figure 9:
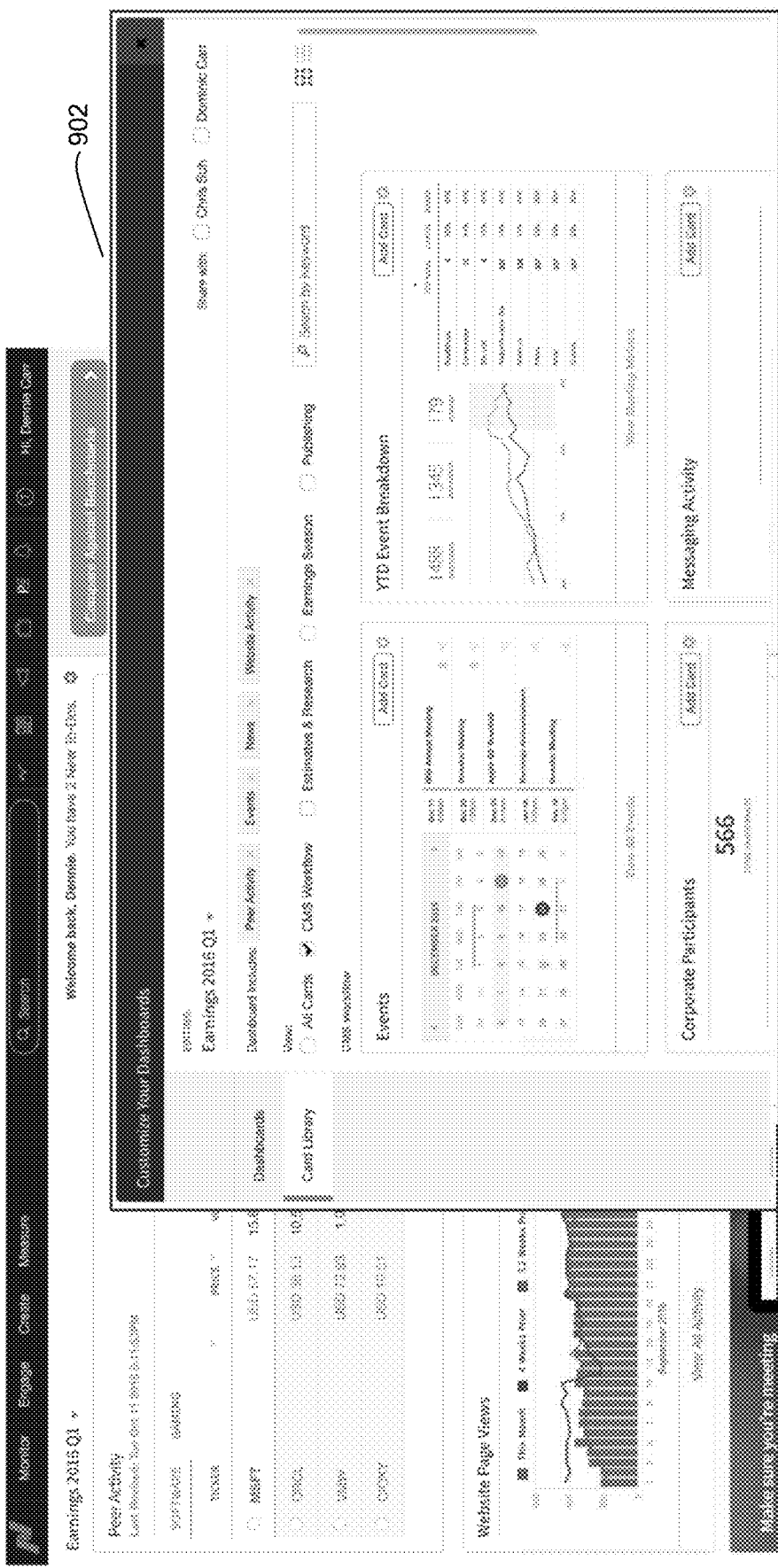
FIG. 9 illustrates an example interface for customizing a dashboard, according to some example embodiments.

Example embodiments enable the logged in user to create and customize his dashboards in the portal 404. A customization screen, according to certain example embodiments, is shown in FIG. 9. A user can add a new dashboard with a given name such as e.g. Earnings 2016 Q1, which may be an empty dashboard layout. Once the dashboard is created, the user may open the customize/manage dashboards screen to add widgets to the dashboard. The widget library will list all the available widgets based on the entitlement and the same can be added to any dashboard. In the same way, add, remove and layout of any dashboard may be altered and/or managed.

In example embodiments, a portal view may be available for each hosted dashboard which is created by the user or to facilitate new dashboard creation. In some embodiments, a framework app which is defined with dashboardConfig.xml (e.g., a user configurable file) file and driven by entitlements (e.g., checking of entitlements for various required services) may be used to provide this facility. This framework app may have routes to create, view and/or manage dashboard.

Figure 11:
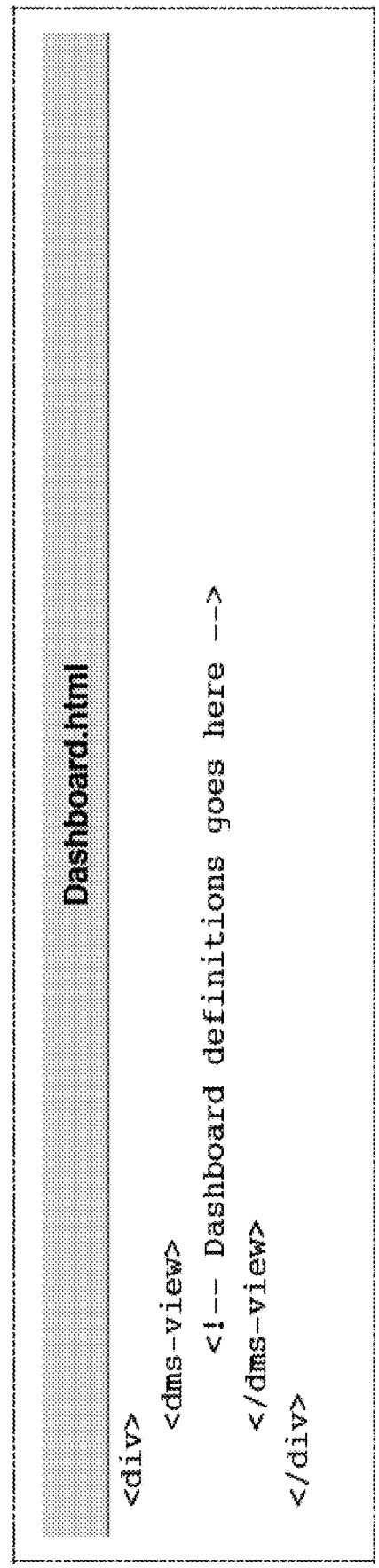
FIG. 11 illustrates an example code snippet for rendering widgets on a web page, according to some example embodiments.

Each dashboard may be uniquely identified by a dashboardID. For example, when a dashboard is created, a unique ID may be assigned against the user. When a logged in user attempts to load a dashboard with an ID, he/she will be landed a URL such as "portal/content/dashboard#/dashboard/<1234>". Based on the ID the user's dashboard related data and widget details will be fetched from the database and used to render the dashboard UI. The UI part may be handled by the AngularJS directives, which are created as part of the distributable AngularJS module (e.g. dms.package). The dashboard app, may create input configuration for the AngularJS module and the directive "dms-view" may be added along with ui-view directive to render widgets on the page. For example, FIG. 11 illustrates a code snippet for invoking a dashboard.

The required configuration details may be set to the angularJS module before the directive is rendered. The angularJS module may also further use directives such as "dms-widget" etc. to render the dashboard. There may be multiple containers which may be created as directive under angularJS module to support the dashboard rendering. The final layout may look like that shown, for example, in FIG. 12.

The state may be cached in different categories such as, for example, widget data, widget filter settings and widget positions (e.g., from Packery). The Packery positions of widgets, for example, may be read and retained at the user level, so that whenever the user logs in again, the same layout can be shown. In some embodiments, a caching library in the portal or in the dashboard SDK may facilitate caching dashboard and widgets at multiple levels. The cached state may include the set of widgets in the dashboard, a state of the data displayed in the dashboard, and the arrangement of the widgets. The state may also include active context in the dashboard.

In some example embodiments, the dashboard management screen may have two tabs, one list all the dashboards created and shared with the logged in user (subject to change) and another tab may list all the dashboards in a drop-down and the user can change the selection to manage the widgets in the dashboard layout. The changes are saved as per the user action, and the changes are reflected in the dashboard when the user navigates to it again In addition, example embodiments may also implement copy dashboard, share dashboard and filtering widgets in the UI.

Figure 13:
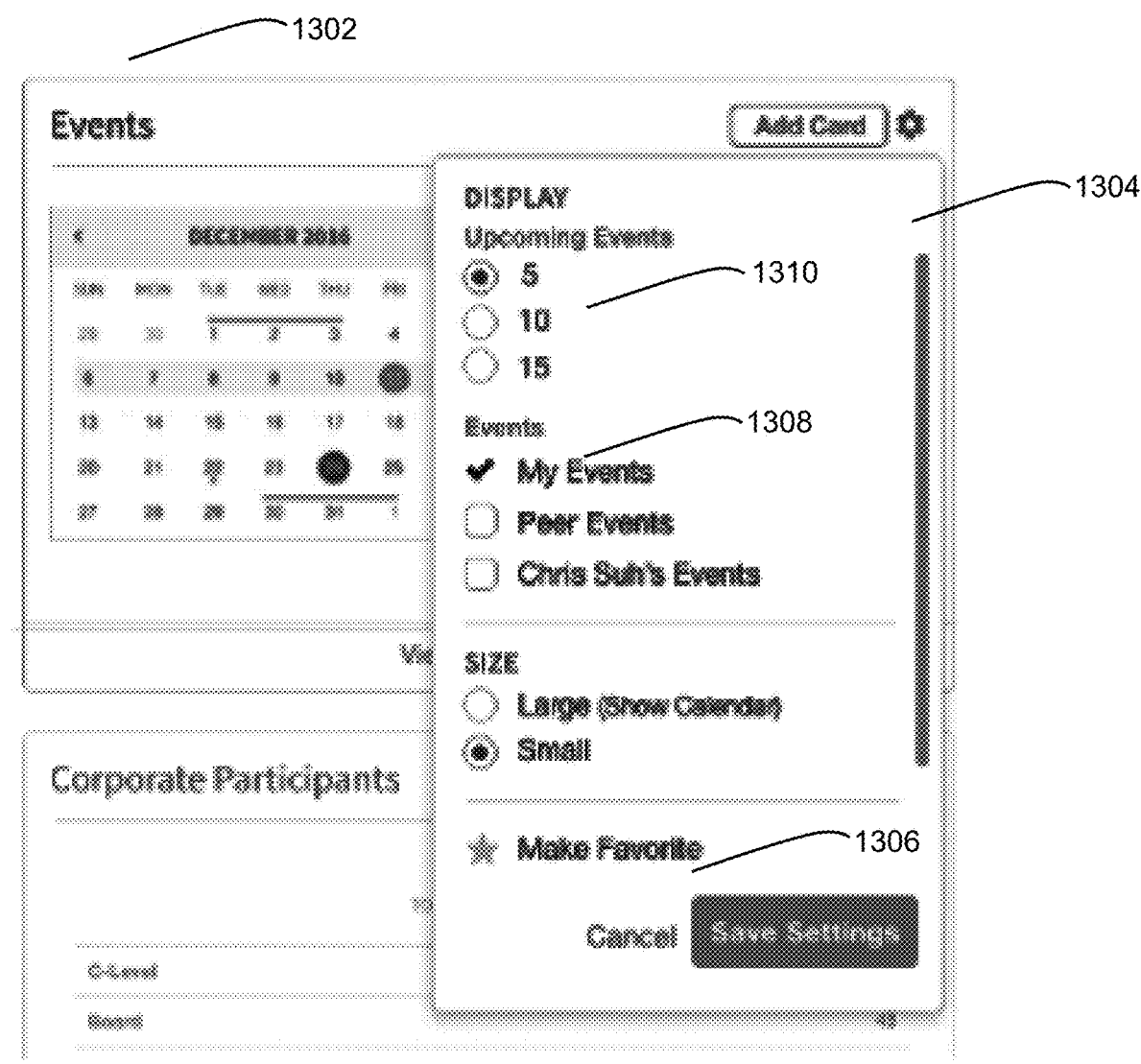
FIG. 13 illustrates an example code snippet for subscribing and publishing context changes to widgets, according to some example embodiments.

The widget settings may be classified into few categories: dashboard specific widget settings (e.g. make it favorite), widget specific static settings (e.g. events filters like my event and peer events), and widget specific dynamic settings (e.g. events filter to choose focus ticker etc.). FIG. 13 below illustrates an example user interface for specifying widget settings.

The support needed on dashboard specific widget settings, may be published along with the widget metadata into the portal system by the widget developers. For example, if a widget supports 50% and 100% layout size then the developer may add that setting details into the metadata when he/she publishes the widget. The portal may store that against the widget in a database and render settings accordingly when the widget is added to any dashboard layout.

The saved state of widgets may also include the state of filters. For example, when a filter state is changed between user sessions, the changed state may need to be retained. Some embodiments may implement a contract between widget and the container in order to efficiently create widget-specific state.

Description of FIG. 4B

FIG. 4B illustrates a logical view of interactions between the DMS environment 403 and other web applications 412a and 412b in the dashboard management system, according to some example embodiments. Note that the system shown in FIG. 4B is similar to that of FIG. 4A, except that the portal aspects 402, 404 and 406 are not in the system of FIG. 4B and have been replaced by DMS environment 403.

Thus FIG. 4A shows a portal-only system and FIG. 4B shows a DMS-only system. The portal of FIG. 4A provides for developing and sharing widgets to a common/unified platform (e.g., to the portal); but DMS environment shown in FIG. 4B is a web platform which is primarily targeted to develop manageable web components and which also provides the benefits of sharing and others features. In the portal version (FIG. 4A), different web applications contribute to the portal platform. But in the case of DMS environment there is no requirement for a central website product like the portal at http://portal.nasdaq.com 401 to enable sharing and reuse of widgets. In the DMS environment shown in FIG. 4B, any web product which uses a DMS hosting container provided by the DMS environment 403 can consume widgets/components which are made available through the DMS environment (e.g., widgets are developed and made available through DMS service by different development teams).

Since there is no portal as a hosting platform, in the FIG. 4B environment, any web application can host DMS widgets/components if they have the DMS hosting container integrated. The hosting container may be a place-holder in a web application where DMS widgets can be loaded based on various parameters. The DMS hosting container, will also establish a communication layer between component and container (which is the hosting application). Any web application can add a hosting container by integrating the DMS JavaScript library into their web page. The library provides Custom HTML elements (AngularJS) which can be added as a placeholder to load DMS dashboards. The DMS dashboards/Views are referred by unique names and the same is passed as an argument to the DMS hosting container to render Widgets with in the hosting container. It is up to the consuming product (Web Application) how they can parameterize the unique dashboard names based on user actions/navigations.

Thus, as shown in FIG. 4B, enterprise web applications 412a and 412b may develop widgets, and at least some of the widgets developed in their own environments may be provided to the DMS backend 407 to be shared with other web applications accessing the DMS 403. For example, IR website 412a may publish a widget that was developed in its environment (i.e. within application 412a) but using the DMS framework including build command and CLI tools from DMS environment 403, to DMS backend 407. That widget can now be included in a dashboard created by PR website 412b by simply including it in a DMS hosting container. In example embodiments, the source code for the widget shared by IR website 412a is required to exist only at the DMS backend 407. This is another aspect which is in contrast to the portal-only approach where the shared widgets would have copies of the source code at the creating application as well as at the portal.

DMS service 405 exposes a set of APIs which can be consumed by applications (e.g., enterprise applications 412a and 412b) and DMS admin interface 411. The applications may obtain the input model and handles to DMS client framework to render dashboard and views from the DMS service API. DMS service 405 also operates to save the settings and widget related metadata into the DMS backend 407.

The DMS backend 407 may include one or more database servers that store the (in some embodiments, all) configurations and widget related metadata (e.g., and an optional S3 instance, where the database will store the configurations and widget related metadata). The database can also store the source code bundles (packages) or optionally it can be stored in S3 servers for improved manageability.

A DMS data API may include internal or external APIs which provide data to the widgets/components, and can be configured through DMS.

The DMS admin interface provides an internal support application which helps to configure and manage dashboards and widgets with respect to web applications. The product/enterprise web application owners and developers use this interface to create new views or manipulate components in a live product.

DMS commands and tools are set of build commands and tools made available for developers to help development of new widgets to an specific environment (based on access/entitlement level). Tools like Webpack™ are configured to make the bundling process easier.

In example embodiments, a view may be available for each hosted dashboard which is created by the user or to facilitate new dashboard creation. In some embodiments, a framework app which is defined with dashboardConfig.xml (e.g., a user configurable file) file and driven by entitlements (e.g., checking of entitlements for various required services) may be used to provide this facility. This framework app may have routes to create, view and/or manage dashboard.

Each dashboard may be uniquely identified by a dashboardID. For example, when a dashboard is created, a unique ID may be assigned against the user. When a logged in user attempts to load a dashboard with an ID, he/she will be landed a URL such as "portal/content/dashboard#/dashboard/<1234>". Based on the ID the user's dashboard related data and widget details will be fetched from the database and used to render the dashboard UI. The UI part may be handled by the AngularJS directives, which are created as part of the distributable AngularJS module (e.g. dms.package). The dashboard app, may create input configuration for the AngularJS module and the directive "dms-view" may be added along with ui-view directive to render widgets on the page. For example, FIG. 11 illustrates a code snippet for invoking a dashboard.

The required configuration details may be set to the angularJS module before the directive is rendered. The angularJS module may also further use directives such as "dms-widget" etc. to render the dashboard. There may be multiple containers which may be created as directive under angularJS module to support the dashboard rendering. The final layout may look like that shown, for example, in FIG. 12.

The state may be cached in different categories such as, for example, widget data, widget filter settings and widget positions (e.g., from Packery). The Packery positions of widgets, for example, may be read and retained at the user level, so that whenever the user logs in again, the same layout can be shown. In some embodiments, a caching library in the portal or in the dashboard SDK may facilitate caching dashboard and widgets at multiple levels. The cached state may include the set of widgets in the dashboard, a state of the data displayed in the dashboard, and the arrangement of the widgets. The state may also include active context in the dashboard.

In some example embodiments, the dashboard management screen may have two tabs, one list all the dashboards created and shared with the logged in user (subject to change) and another tab may list all the dashboards in a drop-down and the user can change the selection to manage the widgets in the dashboard layout. The changes are saved as per the user action, and the changes are reflected in the dashboard when the user navigates to it again In addition, example embodiments may also implement copy dashboard, share dashboard and filtering widgets in the UI.

The widget settings may be classified into few categories: dashboard specific widget settings (e.g. make it favorite), widget specific static settings (e.g. events filters like my event and peer events), and widget specific dynamic settings (e.g. events filter to choose focus ticker etc.). FIG. 13 below illustrates an example user interface for specifying widget settings.

The support needed on dashboard specific widget settings, may be published along with the widget metadata into the portal system by the widget developers. For example, if a widget supports 50% and 100% layout size then the developer may add that setting details into the metadata when he/she publishes the widget. The portal may store that against the widget in a database and render settings accordingly when the widget is added to any dashboard layout.

The saved state of widgets may also include the state of filters. For example, when a filter state is changed between user sessions, the changed state may need to be retained. Some embodiments may implement a contract between widget and the container in order to efficiently create widget-specific state.

In FIG. 4B, operations other than those requiring or involving the portal are the same or similar as the corresponding operations described in relation to FIG. 4A, and are therefore not described again.

Description of FIG. 5

FIG. 5 illustrates a more detailed view of the logical view shown in FIG. 3, according to some example embodiments. FIG. 5 shows the dashboard management system 502 comprising a dashboard SDK/script library 504, a dashboard framework 506, a core UI framework 508 and an AngularJS module library 510.

The AngularJS modules 510 may include a UIRouter and/or UIBootstrap types of AngularJS library which can facilitate the addition of a dashboard with little or no effort to any AngularJS projects. This may be added as a module to an AngularJS application (e.g., dms.package), and thus enable taking advantage of dashboard related features. The features can be of a services, helpers and directives. Additionally, a directive may be available to make an AngularJS page as a dashboard page (e.g., dms-view). There may also be a generic data service, which can manage the widget data (individual widgets can also manage data by themselves). A $serviceProvider may be made available to set different dashboard layouts and themes (similar to how $state and routes are set when UIRouter is used).

The core UI framework 508 provides user interface elements, scripts, etc. for facilitating the development of views.

The dashboard framework 506 includes a widget registry 512, a context manager 514, a layout manager 516, a personalization module 518, data gateway 522, preferences 524 and cache 526.

The widget registry 512 keeps track of the widgets in the widget library.

The context manager 514, as described above and also below in relation to FIG. 9, manages the context changes in a dashboard in accordance with context change publications and subscriptions by widgets.

The layout manager 516 operates to arrange the widgets in the dashboard, and may include functionality to re-arrange the widgets when a new widget is added, one or more widgets are removed etc. The layout manager 516 may provide or configure a layout component which is a type of web component created as, for example, an AngularJS module which comprises of set of HTML templates, routes and reference to child components. A layout component may be used to define a view/SPA in web application, typically a layout component will have definition for parent layout, navigation menus and certain global components (like quick search, user avatar, etc.) based on where it is getting integrated.

The personalization module 518 enables the widgets and the dashboard to be customized. Customization includes, in addition to selecting the widgets according to their functions, controlling the appearance of the dashboard and/or respective widgets.

The data gateway 520 may provide a unified address (e.g. URL) for entry (and control) by front end clients such as browsers to access various backend services. The data gateway may also facilitate monitoring such as by authentication, rate limiting, logging etc.

Preferences 522 enables specifying and storing user preferences with regard to the dashboard, individual widgets, etc.

The cache 524 may facilitate caching dashboard layout and/or widgets at multiple levels. Caching may enable quicker rendering of the dashboard in accordance with a user's latest use of the dashboard.

The dashboard SDK 504 includes a template module 526, a toolkit module 528, a test harness module 530, versioning 532, publish utility 534 and documentation 536.

The templates module 526, enables the users to select among several appearances of the dashboard. The selected templates may be rendered in the AngularJS views.

As described above, toolkit 528 may include many tools, including, for example, tools for packaging and publishing, etc. A test harness 530 may provide one or more shell applications for testing respective widgets for appearance and function. A versioning system 532 may operate to maintain more than one version of a widget and/or dashboard. A publishing utility 534 facilitates publishing the widgets to the portal, and documentation 536 includes help manuals etc. that can guide the users of the system.

Figure 6:
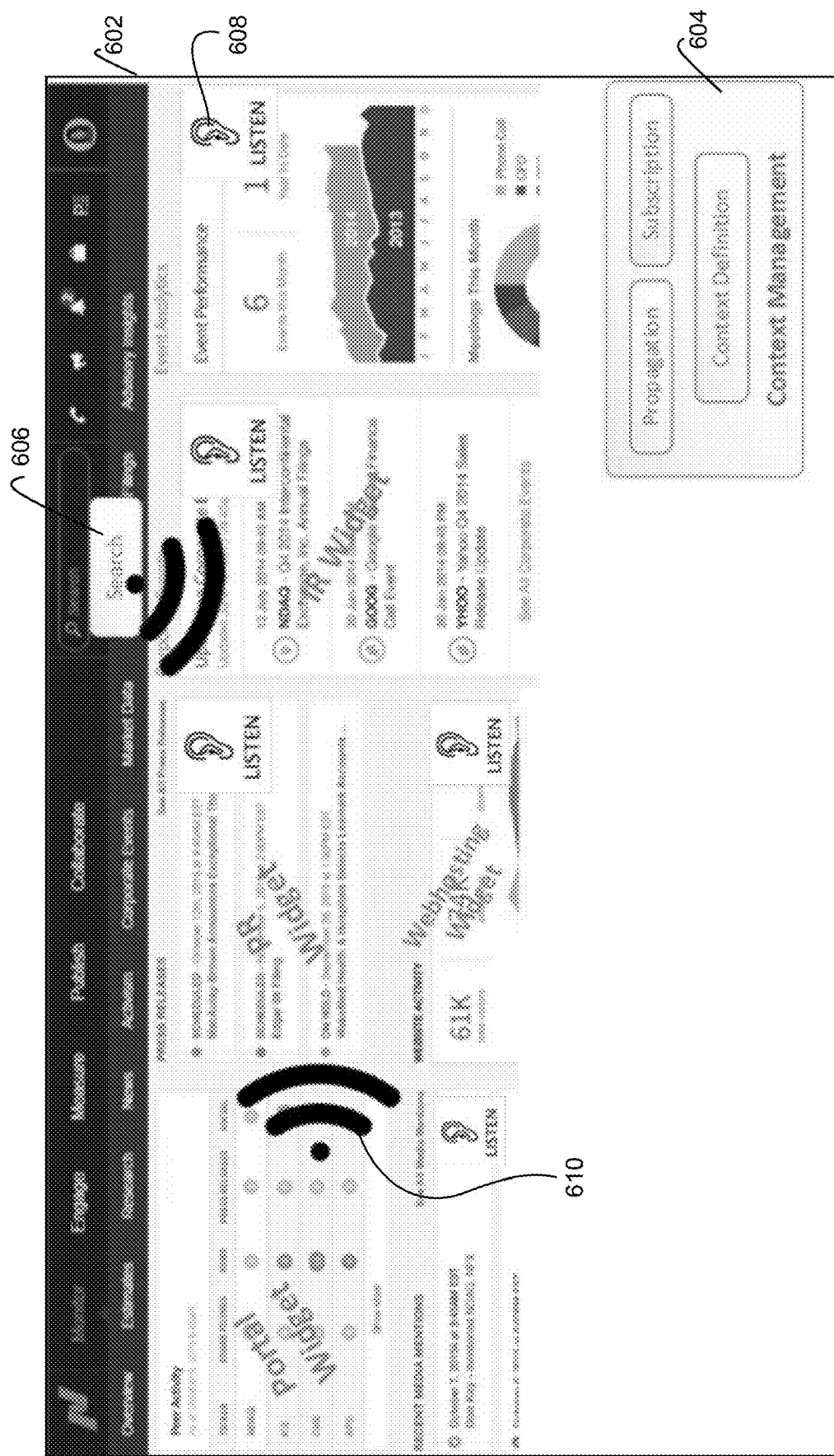
FIG. 6 illustrates an interface that provides for registering context information for widgets, according to some example embodiments.

Description of FIG. 6

FIG. 6 illustrates an interface 602 that provides for registering context information for widgets, according to some example embodiments.

Context may be available anywhere in the portal (widget or full page control). The dashboard, containers and/or widgets can publish and listen to context. Context may be driven by entitlements and individual app data. Widgets may be aware of user's context and honor entitlements. User experience is a combination of navigation, context and entitlements. The layout (with styles), widget and data information for the dashboard will be made available by the consumer app (e.g., platform view/portal view (based on UI framework) which hosts the dashboard) that renders the dashboard in the browser or app on the user device.

Interface 602 provides the user with the capability to, in a particular dashboard layout, identify and/or configure the relationship between publishing widgets and listening widgets. As illustrated in the example interface 602, the "portal widget" (e.g., "portal widget" may not be available in DMS-only embodiments related to FIG. 4B) and the "search" menu may be configured to publish its context (e.g., widgets annotated with the publish marker 610), whereas several other widgets may be configured to listen to context (e.g., widgets annotated with the listen marker 608).

The context publish and listen for each widget, container or the portal may be configured by specifying in a configuration file, by editing the code, and/or by identifying each widget by marking as publish or listen (e.g., as shown by markings 608 and 610). When the widgets whose context configuration needs to be created and/or edited is identified, the user may be provided with an interface to edit and/or generate the context configuration for each such widget, and the system may automatically update the configuration of each widget as necessary to publish and/or listen to the context.

An example context change may be changing the ticker/symbol for which data is been shown in widgets of a dashboard. There may be multiple ways in which the context can be changed. An example configuration change may occur when a user initiates such a change, e.g., by searching for a company in the search box 606. If the context is changed, then the dashboard framework may trigger a publish event. When this event is triggered then all the widgets which are subscribed (i.e., listening) for the specific context change (in this example, ticker change) will be reloaded to reflect the new data filter. That is, the illustrated PR widget, IR widget etc. may change to displaying information relating to the new ticker.

The user may also be provided with a capability to configure further details of context management by selecting from a menu 604. The menu 604 may allow the user to specify parameters with respect to propagation of context, subscription of context, and management of context. For example, publish/listen configurations applicable to all widgets in the dashboard may be configured through menu 604.

As discussed above, the delivery may be an AngularJS module, which can be included in any AngularJS project and used to render a dashboard layouts. As part of the framework, several features as mentioned above may be created and the same may be delivered through a number of directives and a service provider: the dashboard view directive (e.g., dms-view), the widget container directive (e.g., dms-widget), the AngularJS provider (e.g., "$dmsProvider") service.

The view directive (e.g., dms-view) may be a dashboard container directive which uses configuration values from the consuming module to render the dashboard. It gets the layout (e.g., Packery layout) loaded along with the widget info, which is been configured through the service provider.

The rendered layout may have been widget directives (e.g., "dms-widget" directives) according to the number of widgets in the page. When the widget directives are loaded it assumes all the widget file dependencies are already resolved and start registering all the Angular entities like controller, directives and services based on the widget definition. Once after the registration the widget template and controller will be added and invoked, this completes the widget loading.

The $dmsProvider is an AngularJS provider, which gets input parameters from the consuming Angular app, which in some example embodiments is the platform view. The $dmsProvider can be invoked from the AngularJS Config method in a manner similar to UIRouter State definition. This takes a JSON object as an input, it can be an API promise which can return the object. The term "promise" is used in AngularJS to represent an asynchronous way of resolving dependency. In general, dashboard config (e.g., a JSON file) made available in the view to render at the page loading time. In some example embodiments, this dependency can be resolved asynchronously using an API after the page is rendered, thus improving performance at page rendering time. An example of adding package library to a page is shown by adding the script reference to the AngularJS package (e.g., "dms.package.min.js") file, as shown in FIG. 8.

Context changes are published by the consuming application (e.g., platform view), and the AngularJS library delegates the context change along with the context value to the widgets. This is shown in FIG. 7.

Description of FIG. 7

FIG. 7 illustrates an example code snippets for subscribing and publishing context changes to widgets, according to some example embodiments.

Context changes are published by the consuming application (e.g., portal/platform view). For example, the publishing can be performed by broadcasting a predetermined event indicating that a particular widget's context has changed. The AngularJS library delegates the context change along with the context value to the widgets. Code snippet 702 is an example of publishing a context change by broadcasting an event. Code snippet 704 shows how a widget subscribes to receiving context changes.

Description of FIG. 8

FIG. 8 illustrates an example code snippets for invoking a dashboard, according to some example embodiments.

As illustrated in the code snippet, the input for the provider needs to be detailed and it is constructed by the consuming application (e.g., portal/platform view, consuming web application etc.). Provider may be a framework entity, through which dashboard configuration/metadata that is fetched from a database if fed into the client-side component (e.g., dms.package module). An example of adding package library to a page is shown by adding the script reference to "dms.package.min.js" file.

Description of FIG. 9

FIG. 9 illustrates an example interface for customizing a dashboard, according to some example embodiments. A user can add a new dashboard with a given name such as e.g. Earnings 2016 Q1, which may be an empty dashboard layout. Once the dashboard is created, the user may open the customize/manage dashboards screen 902 to add widgets to the dashboard. The widget library will list all the available widgets based on the entitlement and the same can be added to any dashboard. In the same way add, remove and layout of any dashboard may be altered and/or managed.

Description of FIG. 10

FIG. 10 illustrates an example database for maintaining widget and widget metadata, according to some example embodiments.

All information about dashboards against each user is captured in the database tables under the desired namespace (e.g., dms namespace). There are few tables and relationships are created to manage the dashboard master and user related data. The database structure shown in FIG. 10 enables the identification of each dashboard instance, and the configurations/customizations associated with each.

Description of FIG. 11

FIG. 11 illustrates an example code snippet for rendering widgets on a web page, according to some example embodiments. The dashboard definitions may be specified as a dynamic view to be rendered when the file dashboard.html called by a browser. Based on the information provided or set to the provider as dashboard config, the framework may build the HTML at run time and use the "<dms-view>" as a placeholder to inject the built HTML into it.

Figure 12:
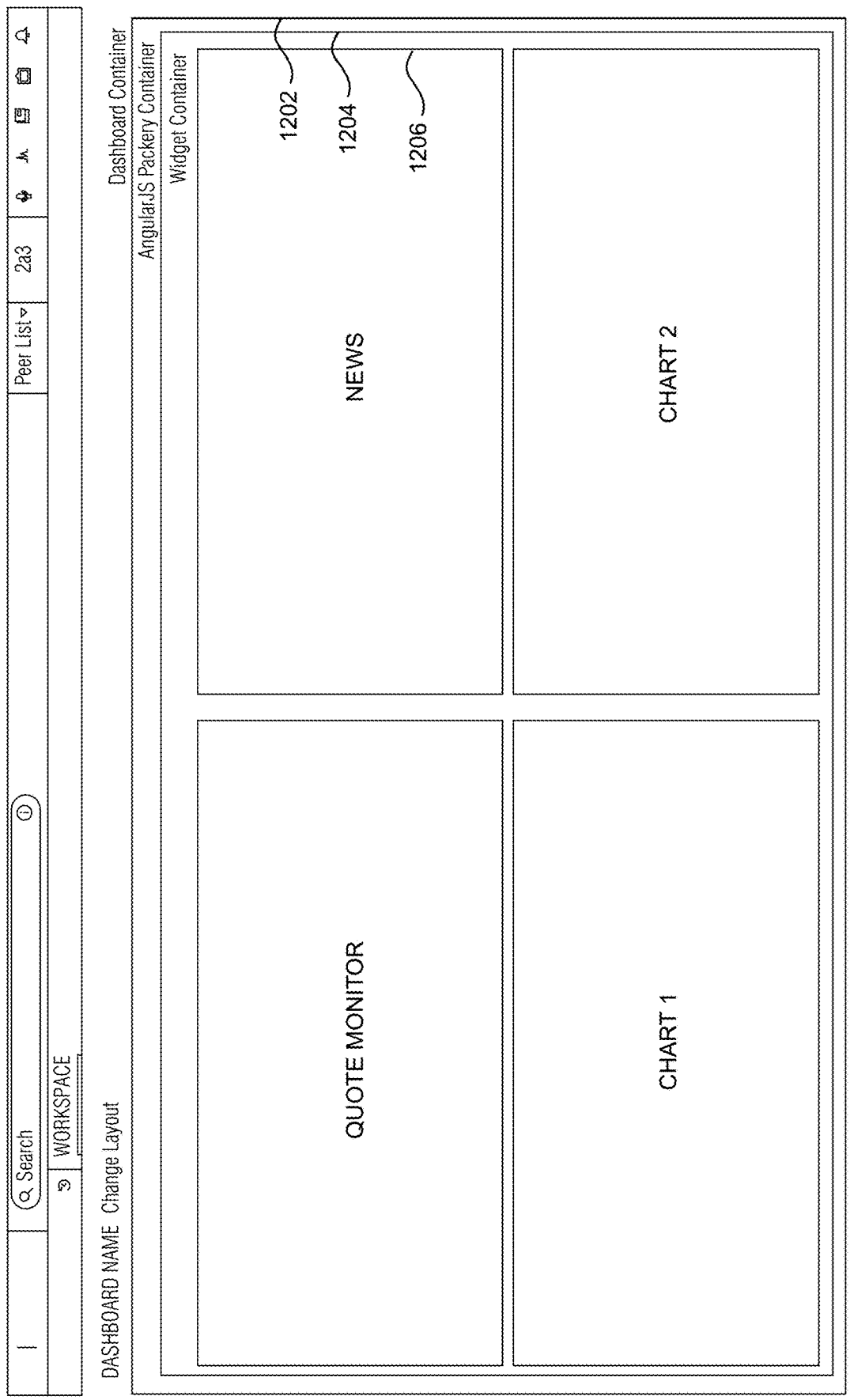
FIG. 12 illustrates the arrangement of dashboard containers, AngularJS containers, and widget containers for a dashboard, according to some example embodiments.

Description of FIG. 12

FIG. 12 illustrates the arrangement of dashboard containers, AngularJS Packery containers, and widget containers for a dashboard, according to some example embodiments. The multiple containers (e.g., multiple levels of nested containers) may be created as directive under portal app (e.g., dms module) to support the dashboard rendering.

In some embodiments, for example in embodiments in which web applications communicate with a DMS such as DMS 403 shown in FIG. 4B, there will be provided a hosting container to host dashboards/views which are created/maintained in the backend system. This may be provided as a framework app and defined with configuration file (e.g., dashboardConfig.xml file) and driven (e.g., access controlled) by entitlements. The framework app may have routes to create or view and manage dashboards. The hosting container may be provided as a web page.

The dashboards may be uniquely identified by the dashboard name. When a user tries to load a dashboard with a name, he/she will be landed on a URL like "portal/content/dashboard/<dashboard name>". Based on the name the user's dashboard related data and widget details may be fetched from a database and used to render the dashboard UI. The UI part may be handled by the AngularJS directives, which are created as part of the distribute-able AngularJS Module (e.g. dms.package). The dashboard application, may create input configuration for the dms.package module and the directive "dms-view" may be added along with ui-view directive to render widgets on the page. There are multiple containers which will be created as directive under dms module to support the dashboard rendering. The final layout may look like that shown in FIG. 12.

Description of FIG. 13

FIG. 13 illustrates an example interface 1304 for specifying and/or modifying settings for widgets, according to some example embodiments. The illustrated example interface 1304 for changing settings of a "Events" widget 1302, enables a user to specify dashboard specific widget settings such as whether to mark this widget a favorite 1306, widget specific static settings such as event filters 1308 like my events and peer events, and widget specific dynamics settings such as event filters 1310 to choose focus ticker etc. The filters may be widget specific.

Figure 14:
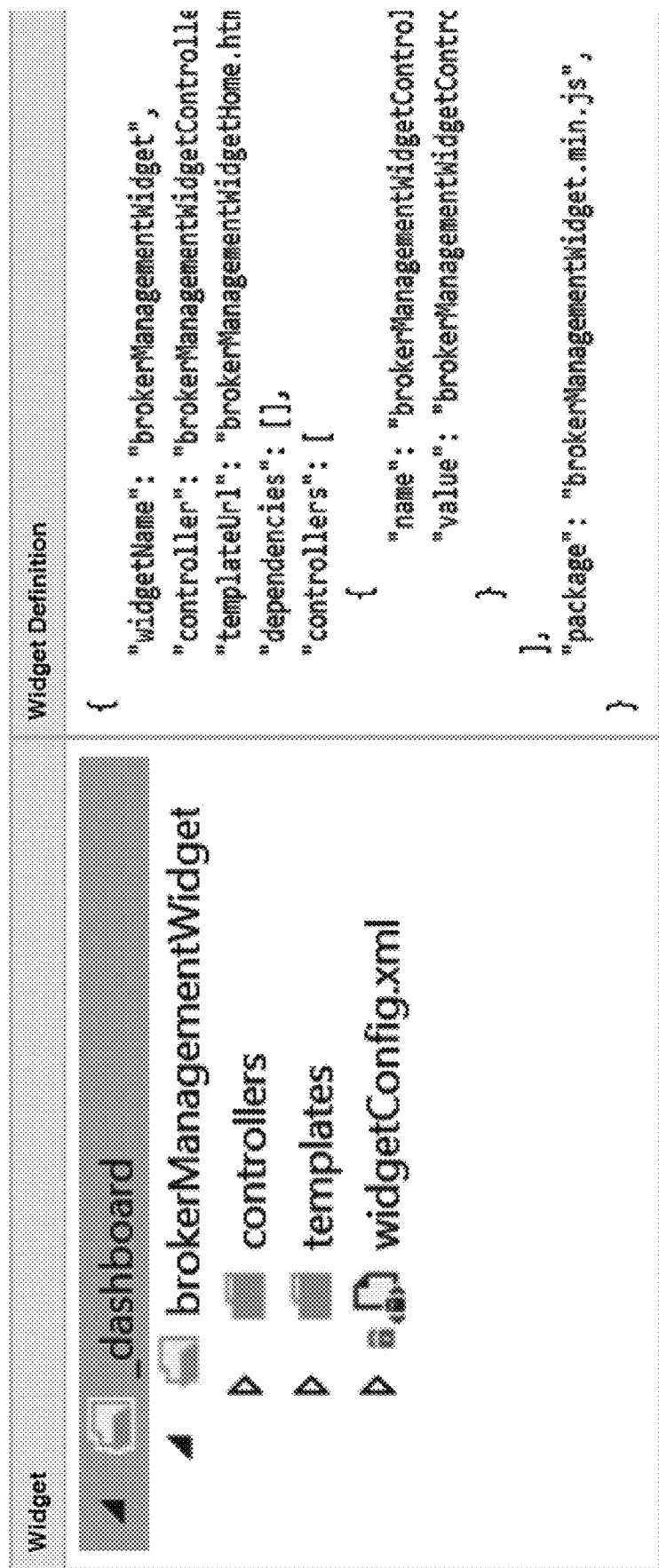
FIG. 14 illustrates the structure and definition of an example widget for use in a dashboard, according to some example embodiments.

Description of FIG. 14

FIG. 14 illustrates the structure and definition of an example widget for use in a dashboard, according to some example embodiments. The example widget (e.g., "brokerManagementWidget") is specified as an AngularJS entity comprising controllers and templates. The widget definition includes a widget name, names and values of controllers, identification of templates, identification of dependencies and the package. Additional widget configuration is specified in a widgetConfig.html file. In widgetConfig.xml, this file may have all the widget related information (js, html files etc).

Description of FIG. 15

FIG. 15 illustrates an example code snippet for template caching during the bundling and packaging process, according to some example embodiments. The code operates to create an AngularJS module and a cache (a template cache) with the same name. This enables each template to be cached against a dynamic module name, and thus avoid dependencies to other modules, facilitating sharing and reusability of widgets.

Figure 16:
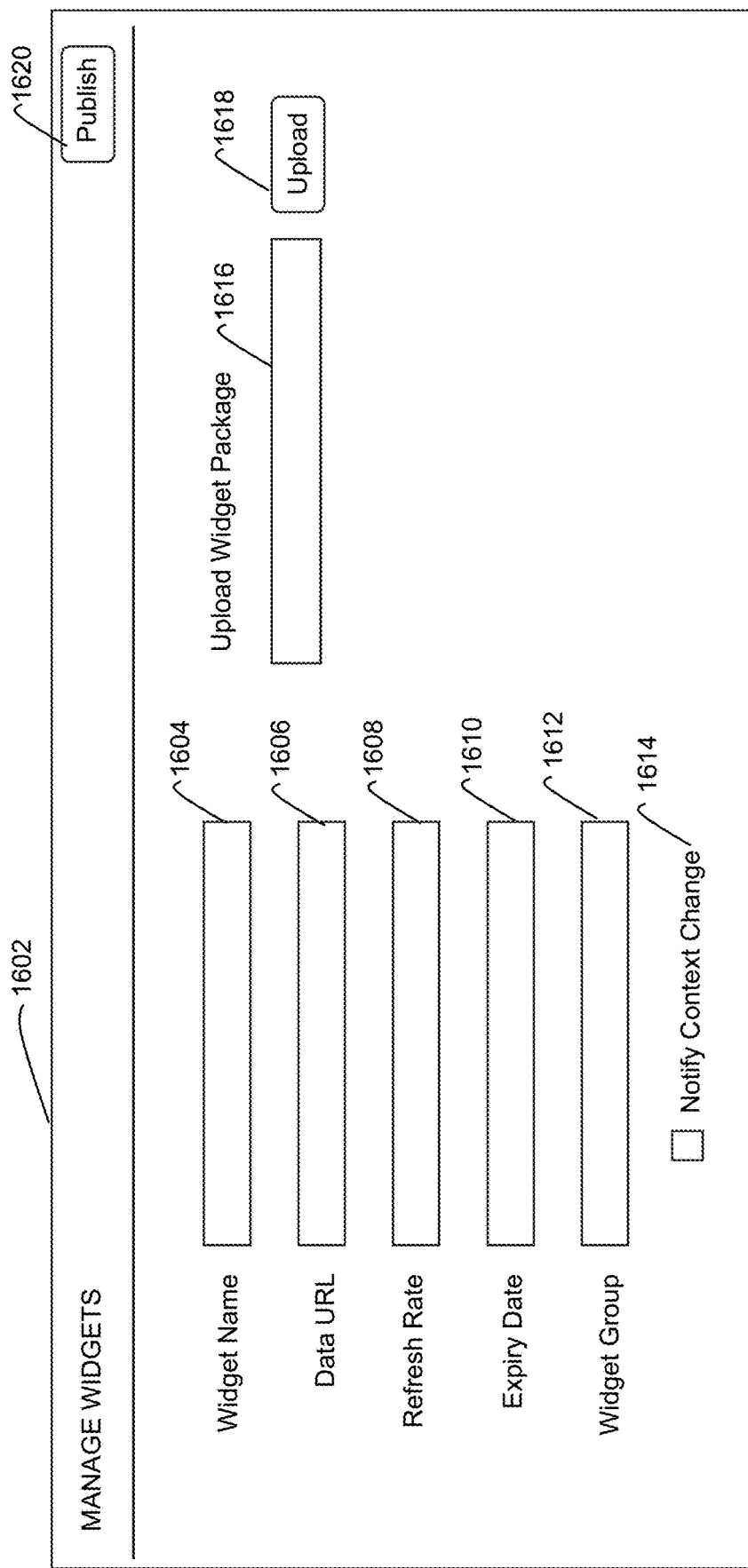
FIG. 16 illustrates an example user interface to facilitate widget management and publishing, according to some example embodiments.

Description of FIG. 16

FIG. 16 illustrates an example user interface to facilitate widget management and publishing, according to some example embodiments. The interface 1602 may interact with an API to manage widgets, and facilitates developers to upload widget packages, add widget metadata, and to publish the widget package to the portal.

Configurable information may include a widget name 1604, a data URL 1606, the data refresh rate 1608, an expiry date 1610 for the widget, a group 1612 to which this widget belongs, indication whether or not to notify of context changes 1614, widget package upload source 1616, button 1618 to select uploading of the widget package, and a button 1620 to choose to publish the widget. In some embodiments, notify context changes 1614 setting may indicate whether or not to listen to context changes (and react accordingly). Whether or not a widget publishes its context may be in code within the widget. In some embodiments, however, interface 1602 may include an input where the user can configure whether or not the widget publishes its context.

Description of FIG. 17

FIG. 17 illustrates a code snippet of an example widget specified as an AngularJS entity, according to some example embodiments. The widget, in addition to specifying a controller and a template, also specifies data services (e.g., "gcsPortalWatchlistSharedService" and "gcsPortalFactsetService") with which it communicates (e.g. obtains data from). These are AngularJS controllers and service names, the implementation of the same will be available in the package. These JSON is helpful for the framework to create AngularJS entities at runtime.

Figure 18:
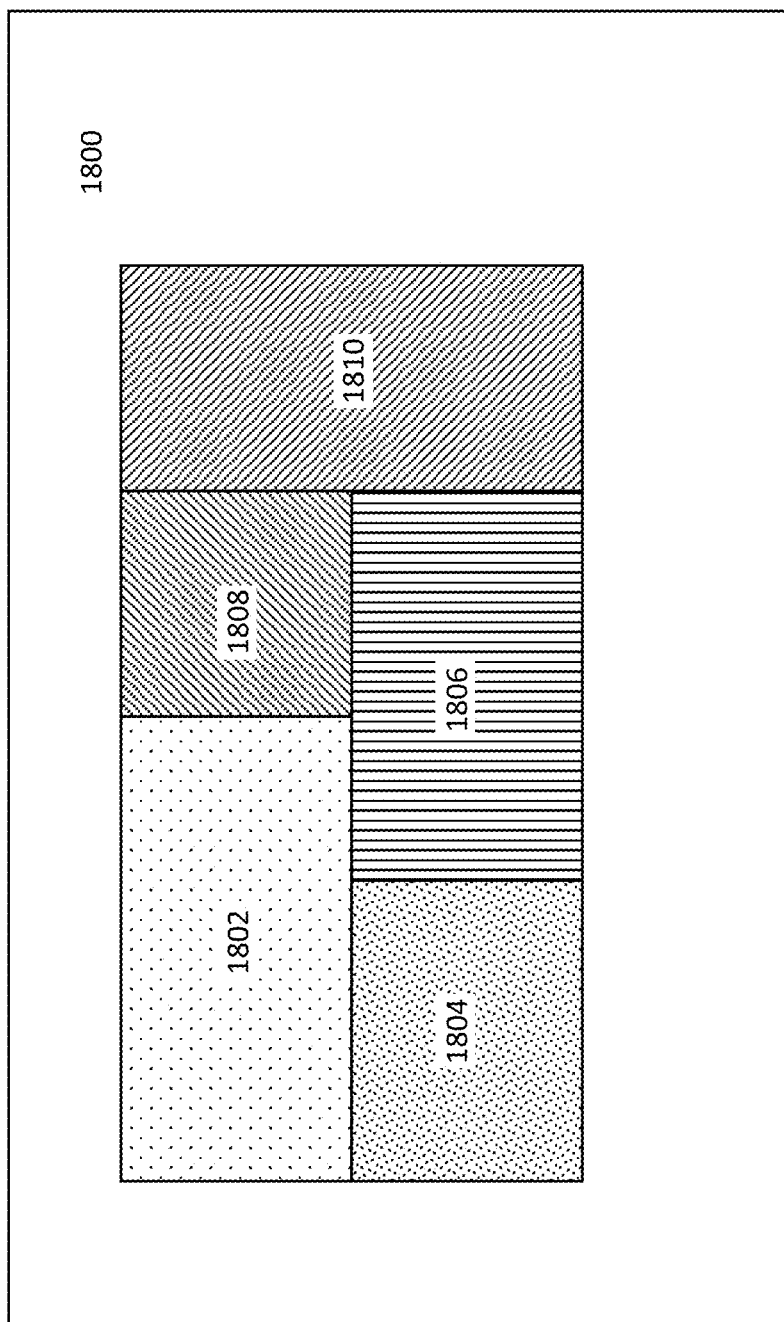
FIG. 18 illustrates an example display of variously sized widgets arranges in a dashboard, according to some example embodiments.

Description of FIG. 18

FIG. 18 illustrates an example display of variously sized widgets arranged in a dashboard 1800, according to some example embodiments. The dashboard 1800 is shown displaying widgets 1802-1810. Some example embodiments enable the user to freely add or remove widgets from the dashboard. The widget arrangement may be dynamically rearranged when an addition or a removal of a widget occurs in a dashboard.

Description of FIG. 19A

FIG. 19A illustrates an interaction diagram showing interactions relating to a user using a dashboard in the portal web application (e.g., portal 404), according to some example embodiments.

Process 1900, comprising operations 1922-1944, may be started when a user access the portal web site on a web server that is hosting the portal web application. The portal web application may provide a user to login to the portal and access a plurality of services (provided by separate web applications) from a single dashboard. The portal web application thus provides the user with more convenient access to certain services provided by a plurality of various other web applications from a single dashboard. The portal may perform single sign on or the like so that the user does not have to separately sign into each of the web applications which are accessed. Moreover, the portal may handle the user's compliance with entitlements etc. to the various web applications and third party web applications.

The operations 1922-1944 are shown in accordance with one embodiments. However, operations 1922-1944 may be performed in different orders in other embodiments, and/or may have one or more other operations, or may lack one or more of the operations.

Client device 1902 may be a device such as device 104 in FIG. 1. Enterprise web application 1912, enterprise portal 1906, enterprise core services 1908, and DBMS 1910 may correspond, respectively, to web application A 112a, portal application 111, core services 114 and DBMS 110. Enterprise web application 1912, enterprise portal 1906, enterprise core services 1908, and DBMS 1910 may be running on a server infrastructure such as server infrastructure 102 shown in FIG. 1.

Process 1900 may be commenced when, at operation 1922, a user using a browser 1904 running on a client device 1902, accesses the portal web application 1906 running on a web server. The user may provide login credentials (e.g., username, password etc.) to the portal web application.

At operation 1924, the portal web application communicates with the core services 1908 to authenticate the user based on the provided login credentials. At operation 1926, core services 1908 communicates with a database 1910 to access stored credential information. By authenticating the credentials against stored information, core services 1908 may perform single sign on of the user into a collection of services provided in the enterprise—such as the privileges to access all of the web applications in the enterprise, a selected group of web applications based on the user's job or other assigned privileges, or a group of web applications determined in accordance with some other criteria. Each user may have a stored profile (e.g. stored in DBMS 1910) or the like specifying the web applications to which the user is subscribed.

After the user is authenticated and signed on, at operation 1928, the user's profile information may be accessed by the system. The profile information may specify how the user's default view(s) are to be configured. For example, the profile may specify that a particular dashboard A is to be displayed as the default dashboard for the user. After determining the one or more dashboards to be provided to the user, the set of widgets that are to be displayed on the determined dashboard(s) is determined. As discussed above, each dashboard in the system may be identified with a unique identifier, and the widgets may be associated with the unique identifiers of the respective dashboards in which they appear. FIG. 10 above illustrates an example data structure or logical organization that may be used to maintain the dashboard and widget information. Some widgets may be shared across two or more dashboards, and some may be used in only a single dashboard.

At operations 1930, widget metadata is obtained for the determined set of widgets. The metadata may include information such as widget header, footer text, data refresh interval, expiry date (if applicable), context, etc. In some example embodiments, the user may provide at least some of the associated metadata via a form such as the form shown in FIG. 16. In some example embodiments, metadata information such as context may be updated based upon user configuration provided through a user interface including a dashboard layout of widgets such as that, for example, shown in FIG. 6.

At operations 1932-1938 it is determined whether the user is authorized to access/use each of the widgets in the determined set of widgets. As discussed above, certain privileges for accessing data services and the like may be recorded by the system as entitlements for each user or group of users. The entitlements, as discussed above in relation to FIG. 2, may specify selected services or parts of services to which a user has authorized access, times during which the user can access such services, number of concurrent accesses by the same user, volume or time limits on such access, etc. This enables a high degree of management capability, such as capability of an owner of a component to enable/disable components around an application. Also at any point of time, the widget owner or a product owner can disable a particular widget if they see it is no longer valid or needed. In some example embodiments, core services 1908 may provide services that monitor and ensure compliance of users with the various entitlements.

At operations 1932 and 1934, the portal web application 1906 may directly obtain authorization for the user to use one or more widgets from the determined set of widgets from core services 1908, which may if necessary communicate with DBMS 1910. In some embodiments, the portal web application may query each web application associated with any of the widgets in the selected set of widgets to obtain authorization for the user. The enterprise web application 1912, may then itself access core services 1908 to determine whether such authorization complies with the user's entitlements.

At operations 1940, dashboard A is displayed on the screen of the client device, with the set of widgets arranged on it. In some embodiments, if one or more services were denied to the user due to lack of appropriate entitlements, then widgets providing those services may not be displayed on the dashboard A. The remaining widgets may be automatically rearranged relative to each other in the dashboard. In some embodiments, such widgets, may be displayed in the dashboard A, but with an indication that they are inactive and/or that obtaining/upgrade of entitlements is required.

In some embodiments, due to a lack of, or insufficiency of, entitlements, a widget's context may change (e.g., instead of displaying a particular set of market ticker symbols, another set of ticker symbols is displayed). In such even, the widget whose context has changes may publish the context change, and one or more of the other widgets in the dashboard which have subscribed to receiving context changes may respond by accordingly changing its displayed data and/or displayed data formats.

At operation 1942, upon a first widget in the dashboard A being selected by the user, or upon a data update schedule of the first widget, the first widget running in dashboard A accesses its associated enterprise web application by calling an API. The API may be provided by the enterprise web application being called.

At operation 1944, upon a second widget in the dashboard A being selected by the user, or upon a data update schedule of the second widget, the second widget running in dashboard A may directly access a third party data server/service. The access may be based upon an API provided by the third party data server/service.

Description of FIG. 19B

FIG. 19B illustrates an interaction diagram showing interactions relating to a user using a dashboard facilitated by the DMS environment (e.g., DMS 403 shown in FIG. 4B), according to some example embodiments.

A comparison with FIG. 19A will show that, in the embodiment illustrated in FIG. 19B, the portal 1906 has been replaced with DMS environment 1906*b*. The DMS environment 1906*b* may represent a service such as that described in relation to DMS environment 403 in FIG. 4B.

Process 1900*b*, comprising operations 1922*b*-1944*b*, may be started when a user accesses the enterprise web application such as enterprise web application 412*a* or 412*b* shown in relation to FIG. 4B. The web application may provide a user to login to the enterprise system including the DMS environment and access a plurality of services (provided by separate web applications) from a single dashboard. The enterprise web application thus provides the user with more convenient access to certain services provided by a plurality of various other web applications from a single dashboard. As noted above in relation to FIG. 4B and the like, the dashboard in the enterprise web application's environment may use widgets that are created by other web applications and shared by including those widgets in a respective DMS hosting container that interacts with the DMS service to facilitate the sharing and reuse. The system may perform single sign on or the like so that the user does not have to separately sign into each of the web applications which are accessed. Moreover, the DMS service 1906*b* (or sometimes the enterprise web application 1912) may handle the user's compliance with entitlements etc. to the various web applications and third party web applications.

The operations 1922*b*-1944*b* are shown in accordance with one embodiments. However, operations 1922*b*-1944*b* may be performed in different orders in other embodiments, and/or may have one or more other operations, or may lack one or more of the operations.

Client device 1902 may be a device such as device 104 in FIG. 1. Enterprise web application 1912, DMS environment 1906*b*, enterprise core services 1908, and DBMS 1910 may correspond, respectively, to web application A 112*a*, DMS 113, core services 114 and DBMS 110. Enterprise web application 1912, DMS 1906*b*, enterprise core services 1908, and DBMS 1910 may be running on a server infrastructure such as server infrastructure 102 shown in FIG. 1.

Process 1900*b* may be commenced when, at operation 1922*b*, a user using a browser 1904 running on a client device 1902, accesses the enterprise web application 1912 running on a web server. The user may provide login credentials (e.g., username, password etc.) to the enterprise web application.

At operation 1924*b*, the enterprise web application communicates with the core services 1908 to authenticate the user based on the provided login credentials. At operation 1926*b*, core services 1908 communicates with a database 1910 to access stored credential information. By authenticating the credentials against stored information, core services 1908 may perform single sign on of the user into a collection of services provided in the enterprise—such as the privileges to access all of the web applications in the enterprise, a selected group of web applications based on the user's job or other assigned privileges, or a group of web applications determined in accordance with some other criteria. Each user may have a stored profile (e.g. stored in DBMS 1910) or the like specifying the web applications to which the user is subscribed.

After the user is authenticated and signed on, at operation 1928*b*, the user's profile information may be accessed by the system. The profile information may specify the how the user's default view(s) are to be configured. For example, the profile may specify that a particular dashboard A is to be displayed as the default dashboard for the user. After determining the one or more dashboards to be provided to the user, the set of widgets that are to be displayed on the determined dashboard(s) is determined. As discussed above, each dashboard in the system may be identified with a unique identifier or name, and the widgets may be associated with the unique identifiers of the respective dashboards in which they appear. FIG. 10 above illustrates an example data structure or logical organization that may be used to maintain the dashboard and widget information. Some widgets may be shared across two or more dashboards, and some may be used in only a single dashboard.

At operations 1930*b*, widget metadata is obtained for the determined set of widgets. The metadata may include information such as widget header, footer text, data refresh interval, expiry date (if applicable), context, etc. In some example embodiments, the user may provide at least some of the associated metadata via a form such as the form shown in FIG. 16. In some example embodiments, metadata information such as context may be updated based upon user configuration provided through a user interface including a dashboard layout of widgets such as that, for example, shown in FIG. 6.

At operations 1932*b*-1938*b* it is determined whether the user is authorized to access/use each of the widgets in the determined set of widgets. As discussed above, certain privileges for accessing data services and the like may be recorded by the system as entitlements for each user or group of users. The entitlements, as discussed above in relation to FIG. 2, may specify selected services or parts of services to which a user has authorized access, times during which the user can access such services, number of concurrent accesses by the same user, volume or time limits on such access, etc. This enables a high degree of management capability, such as capability of an owner of a component to enable/disable components around an application. Also at any point of time, the widget owner or a product owner can disable a particular widget if they see it is no longer valid or needed. In some example embodiments, core services 1908 may provide services that monitor and ensure compliance of users with the various entitlements.

At operations 1932*b* and 1934*b*, the DMS 1906*b* (or enterprise web application 1912) may directly obtain authorization for the user to use one or more widgets from the determined set of widgets from core services 1908, which may if necessary communicate with DBMS 1910. In some embodiments, the DMS 1906*b* may query each web application associated with any of the widgets in the selected set of widgets to obtain authorization for the user. The enterprise web application 1912, may then itself access core services 1908 to determine whether such authorization complies with the user's entitlements.

At operations 1940*b*, dashboard A is displayed on the screen of the client device, with the set of widgets arranged on it. In some embodiments, if one or more services were denied to the user due to lack of appropriate entitlements, then widgets providing those services may not be displayed on the dashboard A. The remaining widgets may be automatically rearranged relative to each other in the dashboard.

In some embodiments, such widgets, may be displayed in the dashboard A, but with an indication that they are inactive and/or that obtaining/upgrade of entitlements is required.

In some embodiments, due to a lack of, or insufficiency of, entitlements, a widget's context may change (e.g., instead of displaying a particular set of market ticker symbols, another set of ticker symbols is displayed). In such even, the widget whose context has changes may publish the context change, and one or more of the other widgets in the dashboard which have subscribed to receiving context changes may respond by accordingly changing its displayed data and/or displayed data formats.

At operation 1942*b*, upon a first widget in the dashboard A being selected by the user, or upon a data update schedule of the first widget, the first widget running in dashboard A accesses its associated enterprise web application by calling an API. The API may be provided by the enterprise web application being called.

At operation 1944*b*, upon a second widget in the dashboard A being selected by the user, or upon a data update schedule of the second widget, the second widget running in dashboard A may directly access a third party data server/service. The access may be based upon an API provided by the third party data server/service.

Description of FIG. 20A

FIG. 20A illustrates an interaction diagram showing interactions relating to a developer creating a new dashboard in the portal web application, according to some example embodiments.

Process 2000, comprising operations 2022-2042, may be entered when a user (e.g., a dashboard developer), navigates to the portal, logs in as described in relation to FIG. 19, and thereafter selects to create a new dashboard at operation 2022.

At operation 2024, the portal web application may retrieve available formats for dashboards and obtain from the user a selection from among the available formats. The formats may have been previously configured. An example format that may be presented to the user is shown in FIG. 12.

At operation 2026, the portal web application obtains a list of available widgets. This may be obtained from the database 1910 which may maintain widgets available for use. These widgets may include widgets created in the portal environment and published to the portal, and/or widgets created in another environment, such as, for example, any of the other enterprise web applications 1912. The available widgets may also include widgets from third parties.

At operation 2028, the widget list is presented/displayed to the user, and selections obtained.

At operation 2030, the widget code and widget metadata is obtained for each of the selected widgets.

At operations 2032-2038 the entitlements necessary for the use of the respective widgets are verified. The operations 2032-2038 may be similar to operations 1932-1938 discussed above in relation to process 1900.

At operation 2040, the widgets are arranged in the dashboard format, and displayed to the user. The user may rearrange, make edits to the widget layout in the selected dashboard format and/or customize the dashboard in other ways. Example rearrangement techniques are discussed above in relation to FIG. 18. An example customization screen is shown in FIG. 9.

At operation 2042, the dashboard is saved. The dashboard is saved in association with its unique identifier, and in association with the widgets included in the dashboard. An example, data structure and/or logical organization of the dashboards and widgets is shown in FIG. 10.

Description of FIG. 20B

FIG. 20B illustrates an interaction diagram showing interactions relating to a developer creating a new dashboard facilitated by DMS (e.g. DMS environment 403), according to some example embodiments.

Process 2000b, comprising operations 2022b-2042b, may be entered when a user (e.g., a dashboard developer), navigates to the enterprise web application such as 412a or 412b, logs in as described in relation to FIG. 19B, and thereafter selects to create a new dashboard at operation 2022b.

At operation 2024b, the DMS environment 1906b may retrieve available formats for dashboards and obtain from the user a selection from among the available formats. The formats may have been previously configured. An example format that may be presented to the user is shown in FIG. 12.

At operation 2026b, the DMS environment 1906b obtains a list of available widgets. This may be obtained from the database 1910 which may maintain widgets available for use. These widgets may include widgets created in the portal environment and published to the portal, and/or widgets created in another environment, such as, for example, any of the other enterprise web applications 1912. The available widgets may also include widgets from third parties.

At operation 2028b, the widget list is presented/displayed to the user, and selections obtained.

At operation 2030b, the widget code and widget metadata is obtained for each of the selected widgets.

At operations 2032b-2038b the entitlements necessary for the use of the respective widgets are verified. The operations 2032b-2038b may be similar to operations 1932b-1938b discussed above in relation to process 1900b.

At operation 2040b, the widgets are arranged in the dashboard format, and displayed to the user. The user may rearrange, make edits to the widget layout in the selected dashboard format and/or customize the dashboard in other ways. Example rearrangement techniques are discussed above in relation to FIG. 18. An example customization screen is shown in FIG. 9.

At operation 2042b, the dashboard is saved. The dashboard is saved in association with its unique identifier, and in association with the widgets included in the dashboard. An example, data structure and/or logical organization of the dashboards and widgets is shown in FIG. 10.

Description of FIG. 21A

FIG. 21A illustrates an interaction diagram showing interactions relating to a developer creating a new widget in the portal web application, according to some example embodiments.

Process 2100, comprising operations 2122-2144, may be entered when a user (e.g., a dashboard developer) begins to develop a new widget. In some embodiments, a user may navigate to the portal, log in as described in relation to FIG. 19, and download the dashboard SDK to create a new widget.

At operation 2122, the user downloads the dashboard SDK from the portal, and selects to create a new widget. The SDK may be setup in a development environment 2116 which may be operating in a client device, such as, for example, a client device 1902.

At operation 2124, using the dashboard framework provided in the SDK, a new widget is created and hosted in the local environment provided by a local server/service 2114. The local server/service 2114 may be any enterprise service application such as, for example, web applications 112.

Depending on the data and/or services required by the new widget, the local server/service 2114 may communicate 2126 with enterprise core services 1908 in order to create and store one or more user session. For example, if the new widget requires access to a data streaming service, upon communication 2126, core services 1908 may check entitlements and establish a user session to external and/or internal services as necessary to obtain the data.

After the new widget is successfully hosted in the local environment 2114, at operation 2128 the widget is tested and signed off on. The testing may include, at least in some embodiments, arranging the new widget in a mock dashboard which may also be created using the dashboard SDK. The testing and signoff may be optional.

At operation 2130, the user in the development environment 2116 may use a tool, such as a packaging tool provided in the dashboard SDK, to package the widget for publishing.

At operation 2132, the user in the development environment 2116 may invoke portal API to publish the new widget.

At operations 2134 and 2136, the enterprise portal 1906 interacts with core services 1908 to create a user session for the user, and updates the database 1910 with the widget package and metadata.

The user may then at operation 2138, using a web browser 1904 operating, for example, in client device 1902, access the portal 1906 to create a dashboard including the new widget or to add the new widget to an existing dashboard.

At operation 2140, the portal operates to add the widget to the dashboard.

At operation 2142, the dashboard in which the new widget is arranged is reloaded by browser 1904.

At operation 2144, the user may test the new widget in the portal environment.

Description of FIG. 21B

FIG. 21B illustrates an interaction diagram showing interactions relating to a developer creating a new widget using the DMS environment (e.g. DMS environment 403), according to some example embodiments.

Process 2100b, comprising operations 2122b-2144b, may be entered when a user (e.g., a dashboard developer) begins to develop a new widget. In some embodiments, a user may navigate to the portal, log in as described in relation to FIG. 19B, and download the dashboard SDK/script library from DMS 1906b to create a new widget.

At operation 2122b, the user downloads the dashboard SDK/script library from the DMS 1906b, and selects to create a new widget. The SDK/script library may be setup in a development environment 2116 which may be operating in a client device, such as, for example, a client device 1902.

At operation 2124b, using the dashboard framework provided in the SDK/script library, a new widget is created and hosted in the local environment provided by a local server/service 2114. The local server/service 2114 may be any enterprise service application such as, for example, web applications 112.

Depending on the data and/or services required by the new widget, the local server/service 2114 may communicate 2126b with enterprise core services 1908 in order to create and store one or more user session. For example, if the new widget requires access to a data streaming service, upon communication 2126b, core services 1908 may check entitlements and establish a user session to external and/or internal services as necessary to obtain the data.

After the new widget is successfully hosted in the local environment 2114, at operation 2128b the widget is tested and signed off on. The testing may include, at least in some embodiments, arranging the new widget in a mock dashboard which may also be created using the dashboard SDK/script library.

The testing and signoff may be optional.

At operation 2130b, the user in the development environment 2116 may use a tool, such as a packaging tool provided in the dashboard SDK/script library, to package the widget for publishing.

At operation 2132b, the user in the development environment 2116 may invoke DMS API provided by the DMS service 1906b to publish the new widget.

At operations 2134b and 2136b, the enterprise portal 1906 interacts with core services 1908 to create a user session for the user, and updates the database 1910 with the widget package and metadata.

The user may then at operation 2138b, using a web browser 1904 operating, for example, in client device 1902, access the portal 1906 to create a dashboard including the new widget or to add the new widget to an existing dashboard.

At operation 2140b, the portal operates to add the widget to the dashboard.

At operation 2142b, the dashboard in which the new widget is arranged is reloaded by browser 1904.

At operation 2144b, the user may test the new widget in a particular environment such as, for example, an enterprise web application environment (e.g., IR insight).

Description of FIG. 22

FIG. 22 shows a non-limiting example block diagram of a hardware architecture for the system 100 shown in FIG. 1. In the example shown in FIG. 22, the client system 2210 communicates with a server system 2220 via a network 2240. The network 2240 could comprise a network of interconnected computing devices, such as the internet. The network 2240 could also comprise a local area network (LAN) or could comprise a peer-to-peer connection between the client system 2210 and the server system 2200.

The example client system 2210 and server system 2200 could correspond to clients 104 and server 102 as shown in FIG. 1. That is, the hardware elements (for example, electronic circuits or combinations of circuits) described in FIG. 22 could be used to implement the various software components and actions shown and described herein with reference to FIG. 1. For example, the client system 2210 in FIG. 22 could include at least one processor CPU 2231, at least one memory (or digital storage device) 2232, at least one input/output device I/O 2233, and a component for generating and displaying a user interface UI 2234. The at least one memory 2232 may include a computer readable storage medium such as, for example, random access memory (RAM), static RAM, flash memory, magnetic disk. The I/O device 2233 can be all encompassing and could include a communication device, such as a transceiver for sending and receiving data (e.g., a wireless transceiver, a wired transceiver). I/O device 2233 could also include an interface for connecting a non-transitory computer readable storage medium to the client system 2210 to send and receive data.

It should be appreciated that the combination of elements in client system 2210 could be used to implement the example web browser applications 118 and application client 120 in FIG. 1. For example, the memory 2232 could load the files associated with the application (e.g., HTML, XML, JavaScript files) and the CPU 2231 could be used to execute instructions associated with the application. The I/O device 2233 could be utilized to fetch the various elements comprising the SPA from the server system 2220 and/or to interact with the user.

Server system 2220 also comprises various hardware components used to implement the software elements for server 102 as shown in FIG. 1. For example, server system 102 could also include hardware components of at least one processor CPU 2221, at least one memory 2222, and at least one input/output device I/O 2223. The at least one memory 2222 may include a computer readable storage medium such as, for example, random access memory (RAM), static RAM, flash memory, magnetic disk. The I/O device 2223 can be all encompassing and could include a communication device, such as a transceiver for sending and receiving data (e.g., a wireless transceiver, a wired transceiver, a network interface). I/O device 2223 could also include an interface for connecting a non-transitory computer readable storage medium to the server system 2200 to send and receive data. In one example embodiment, I/O device 2233 of the client system can perform communication via the network with I/O device 2223 of the server system.

Similar to client system 2210, the server system 2220 could implement and/or execute the applications. For example, the memory 2222 could be used to store the information in database 110 as well as the components and files utilized by web servers and application servers associated with, for example, the web applications 112, core services 106, email servers 114. The CPU 2221 could be used in executing the software necessary to generate the respective modules that are requested by and transmitted to the client system 2210. For example, CPU 2221 could be used to generate the necessary modules created by an application server. Likewise, I/O device 2223 can be used by a web server to transmit the different application elements to the client system 2210. Of course, these examples are non-limiting and the system envisions utilizing the hardware elements in a variety of aspects.

In some embodiments, each or any of the CPUs 2221 and 2231 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 2221 and 2231 uses an instruction set architecture such as x86 or Advanced RISC Machine (ARM).

In some embodiments, each or any of the memory devices 2222 and 2232 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 2221 and/or 2231). Memory devices 2222 and 2232 may also include non-volatile computer-readable storage media.

In some embodiments, each or any of the network interface devices which may be provided as an I/O device 2223 and/or 2233 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces which may be provided as an I/O device 2223 and/or 2233 or in UI 2234 is or includes one or more circuits that receive data from the CPU 2221 or 2231, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to a display device which displays the image data. Alternatively or additionally, in some embodiments, each or any of the display interfaces is or includes, for example, a video card, video adapter, or graphics processing unit (GPU).

In some embodiments, each or any of user input adapters comprising user interface 2234 and/or I/O interfaces 2223 and 2233, is or includes one or more circuits that receive and process user input data from one or more user input devices (not separately shown in FIG. 22) that are included in, attached to, or otherwise in communication with the computing device(s), and that output data based on the received input data to the processors. Alternatively or additionally, in some embodiments each or any of the user input adapters is or includes, for example, a PS/2 interface, a USB interface, a touchscreen controller, or the like; and/or the user input adapters facilitates input from user input devices (not shown in FIG. 22) such as, for example, a keyboard, mouse, trackpad, touchscreen, etc.

In some embodiments, a display device such as, but not limited to, one included in UI 2234, may be a Liquid Crystal Display (LCD) display, Light Emitting Diode (LED) display, or other type of display device. In embodiments where the display device is a component of the computing device (e.g., the computing device and the display device are included in a unified housing), the display device may be a touchscreen display or non-touchscreen display. In embodiments where the display device is connected to the computing device (e.g., is external to the computing device and communicates with the computing device via a wire and/or via wireless communication technology), the display device is, for example, an external monitor, projector, television, display screen, etc.

In various embodiments, each computing device 2210 and 2220 includes one, or two, or three, four, or more of each or any of the above-mentioned elements (e.g., the processors 2231 and 2221, memory devices 2232 and 2222, I/O interfaces 2233 and 2223, and UI 2234). Alternatively or additionally, in some embodiments, each computing device includes one or more of: a processing system that includes the processors 2231 and/or 2221; a memory or storage system that includes the memory devices 2232 and/or 2222; and a network interface system that includes the I/O devices 2233 and/or 2223.

The computing devices 2210 and/or 2220 may be arranged, in various embodiments, in many different ways. As just one example, the computing device may be arranged such that the processors include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device may be arranged such that: the processors include two, three, four, five, or more multi-core processors; the network interface devices include a first network interface device that implements Ethernet and a second network interface device that implements WiFi and/or Bluetooth; and the memory devices include a RAM and a flash memory or hard disk.

As previously noted, in some embodiments, client system 2210 could be used to implement the client device 104 and components such as web browser applications 118 and application client 120 shown in FIG. 1. In some embodiments, server system 2220 may implement server infrastructure 102 including components such as database 110, web applications 112, core services 106, email servers 114 etc. Whenever it is described in this document that a software module or software process performs any action, the action is in actuality performed by underlying hardware elements according to the instructions that comprise the software module. In such embodiments, the following applies for each component: (a) the elements of the computing devices 2210 and/or 2220 shown in FIG. 22, or appropriate combinations or subsets of the elements, are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices (e.g., in various embodiments, in a volatile memory device such as a RAM or an instruction register and/or in a non-volatile memory device such as a flash memory or hard disk) and all actions described herein as performed by the software modules are performed by processors in conjunction with, as appropriate, the other elements in and/or connected to the computing device (i.e., the network interface devices, display interfaces, user input adapters, and/or display device; (c) alternatively or additionally, to the extent it is described herein that the component processes and/or otherwise handles data, in some embodiments, such data is stored in memory devices (e.g., in some embodiments, in a volatile memory device such as a RAM and/or in a non-volatile memory device such as a flash memory or hard disk) and/or is processed/handled by the processors in conjunction, as appropriate, the other elements in and/or connected to the computing device (i.e., the network interface devices, display interfaces, user input adapters, and/or display device); (d) alternatively or additionally, in some embodiments, the memory devices store instructions that, when executed by the processors, cause the processors to perform, in conjunction with, as appropriate, the other elements in and/or connected to the computing device (i.e., the memory devices, network interface devices, display interfaces, user input adapters, and/or display device), each or any combination of actions described herein as performed by the component and/or by any software modules described herein as included within the component.

The hardware configurations shown in FIG. 22 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 22, (e) via other hardware arrangements, architectures, and configurations, and/or via combinations of the technology described in (a) through (e).

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits (e.g., as shown in FIG. 22), using software programs (e.g., as shown in FIG. 1) and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models, and/or distributed databases) may be used to store and manipulate data.

Technical Advantages of Described Subject Matter

Certain example embodiments provide for a portal web application that enables developing dashboards incorporating widgets from a plurality of web applications, and for publishing and providing access to widgets developed in other web applications. Certain other example embodiments provide a DMS environment that enables developing dashboards incorporating widgets from a plurality of web applications, and for publishing and providing access to widgets developed in other web applications. The dashboards integrating widgets from multiple web applications, according to some example embodiments, provide improved capabilities to the enterprise web application clients. The improved capabilities may include a smaller streamlined code base because specialized development teams can focus on particular products and easily share their product as a widget and/or dashboard with multiple enterprise web applications, faster development due to new authoring and testing capabilities, etc.

The technical features described herein may thus may improve the efficiency with which dashboard development and deployment can be performed, facilitate new dashboards comprising widgets developed for other web application environments, facilitate streamlining of authorizations required for certain data services underlying some widgets in dashboards, and enable developers to develop widgets capable of deployment a plurality of web applications. Moreover, the technical features may improve the performance of the enterprise web application environment and the computer systems executing the enterprise web applications by speeding up the integration and deployment of widgets and providing widgets capable of being accessed by multiple enterprise web applications.

The advantages may also include improving the re-usability, ease of going live, ease of adopting changes and rapid development of web components developed according to embodiments.

Additional Applications of Described Subject Matter

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

While the technology has been described in relation to AngularJS, this is done for ease of description; it is to be understood that the technology described in this document is applicable in the context of other SPA technologies, other web technologies, and/or any other software technology.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one,"

"one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A system providing enterprise web application dashboards, the system comprising:
    a processing system comprising one or more processors configured to provide a user interface on a client device to create or modify a dashboard of widgets;
    at least one memory storing published widgets,
    wherein the dashboard of widgets displayed on the user interface includes one or more widgets from the published widgets;
    wherein the at least one memory further stores first information associating one or more entitlements with each user and with each of a plurality of third party services, and second information associating one or more entitlements with respective published widgets,
    wherein the one or more processors are further configured to:
    in response to a selection by a user of a first widget from the published widgets to display in the dashboard, display the first widget in the dashboard in accordance with a status of an entitlement associating the user to a third party data service accessed by the first widget.

2. The system according to claim 1, wherein, when the first widget is prevented from displaying in the dashboard: (a) widgets are automatically rearranged in the dashboard, and at least one widget in the dashboard automatically changes its displayed data in response.

3. The system according to claim 1, wherein a context of the first widget is configured to be published by the first widget and the dashboard, and wherein at least one widget in the dashboard dynamically changes its display in response to a change in the context of the first widget or the dashboard.

4. The system according to claim 3, wherein a portal web application and a dashboard software development kit (SDK) provided by the portal web application, provides a user interface for associating the context with the first widget and other widgets of the dashboard.

5. The system according to claim 1, wherein the at least one storage stores a software development kit (SDK) which includes tools for creating, packaging and publishing widgets, wherein the SDK is downloaded to the user on the client device, and wherein the downloaded SDK is used in a development environment of one of said web applications to create a widget for the dashboard.

6. The system according to claim 5, wherein the at least one storage further stores an Angular JS module, and is provided to the user to use in said development environment to test said created widgets in an environment other than a portal web application.

7. The system according to claim 1, wherein the dashboard includes one or more widgets created using a portal web application.

8. The system according to claim 7, wherein the dashboard includes one or more widgets imported from a third party application different from the portal web application and the plurality of web applications.

9. The system according to claim 1, wherein a portal web application is further configured to host the created or modified dashboard.

10. The system according to claim 1, wherein the one or more processors of the first processing system is configured to enable said web applications to publish widgets without a deployment to a portal web application.

11. The system according to claim 1, wherein the system further comprises a widget metadata database which associates each of a library the published widgets with a respective widget context.

12. The system according to claim 1, further comprising a second storage storing one or more libraries configured for use by applications for creating and rendering dashboards, wherein, one of said libraries is injected as a dependency to a widget, wherein the library includes access to a data service.

13. The system according to claim 1, wherein each widget of the dashboard includes a contract that defines one or more parameters to be satisfied by an application that uses the widget, and wherein the contract is stored in a metadata database in association with the widget.

14. The system according to claim 1, further comprising a database storing information regarding the dashboard, information on each widget in the dashboard, and relationships between widgets in the published widgets.

15. The system according to claim 14, wherein the first processing system is further configured to cache a user state associated with each widget in the dashboard.

16. The system according to claim 1, wherein at least one widget in the published widgets is created in an environment different from a portal web application, and published to the portal web application.

17. The system according to claim 1, wherein at least one widget in the dashboard includes a preconfigured expiry date or expiry time.

18. A method, comprising:
    providing a user interface to create a dashboard of widgets, and publish widgets from one or more web applications;
    enabling a user to select at least one widget from published widgets stored on a first storage to arrange on the dashboard; and
    in response to a selection of a first widget from the published widgets to display in the dashboard, display the first widget in the dashboard if an entitlement associating the user to a third party data service accessed by the first widget is valid, and prevent display of the first widget in the dashboard if said entitlement is not found or is invalid, wherein said entitlement is accessed in first information associating one or more entitlements with each user and with each of a plurality of third party services, and wherein second information associates one or more entitlements with respective ones of the published widgets.

19. A non-transitory computer readable storage medium storing instructions which, when executed by at least one processor of a server computer processing system provides for:

providing a user interface to create a dashboard of widgets, and publish widgets from one or more web applications;

enabling the user to select at least one widget from published widgets stored on a first storage to arrange on the dashboard; and in response to a selection of a first widget from the published widgets to display in the dashboard, display the first widget in the dashboard if an entitlement associating the user to a third party data service accessed by the first widget is valid, and prevent display of the first widget in the dashboard if said entitlement is not found or is invalid, wherein said entitlement is accessed in first information associating one or more entitlements with each user and with each of a plurality of third party services, and wherein second information associates one or more entitlements with respective ones of the published widgets.

* * * * *